United States Patent

(12) United States Patent
Jang et al.

(10) Patent No.: US 7,659,541 B2
(45) Date of Patent: Feb. 9, 2010

(54) LIQUID CRYSTAL DISPLAY DEVICE HAVING A THIN FILM TRANSISTOR SUBSTRATE WITH A MULTI-CELL GAP STRUCTURE AND METHOD OF MANUFACTURING SAME

(75) Inventors: Yong-Kyu Jang, Suwon-si (KR); Jae-Hyun Kim, Seoul (KR); Sang-Woo Kim, Suwon-si (KR); Jae-Young Lee, Seoul (KR); Sung-Eun Cha, Geoje-si (KR); Young-Nam Yun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/739,808

(22) Filed: Apr. 25, 2007

(65) Prior Publication Data

US 2007/0200966 A1 Aug. 30, 2007

Related U.S. Application Data

(63) Continuation of application No. 10/727,216, filed on Dec. 3, 2003, now Pat. No. 7,223,999.

(30) Foreign Application Priority Data

Dec. 6, 2002 (KR) .............................. 2002-77346
Jan. 8, 2003 (KR) .............................. 2003-1107
Feb. 6, 2003 (KR) .............................. 2003-7539

(51) Int. Cl.
*H01L 29/04* (2006.01)
(52) U.S. Cl. .............................. 257/72; 257/57; 257/83; 257/290; 257/351; 257/E31.082
(58) Field of Classification Search .................. 257/57, 257/59, 72, 257, 368, 83, 290, 351
See application file for complete search history.

(56) References Cited

U.S. PATENT DOCUMENTS

| 6,195,140 | B1 | 2/2001 | Kubo et al. | |
|---|---|---|---|---|
| 6,341,002 | B1 | 1/2002 | Shimizu et al. | |
| 6,384,818 | B1* | 5/2002 | Yamazaki et al. | 345/206 |
| 2002/0105604 | A1 | 8/2002 | Ha et al. | |
| 2003/0016322 | A1* | 1/2003 | Ha et al. | 349/113 |
| 2003/0103179 | A1* | 6/2003 | Hayata et al. | 349/113 |
| 2003/0133059 | A1* | 7/2003 | Wei et al. | 349/113 |

FOREIGN PATENT DOCUMENTS

| CN | 1317106 A | 10/2001 |
|---|---|---|
| JP | 2000-305110 | 11/2000 |
| KR | 2001-0048150 | 6/2001 |
| WO | WO 02/063388 | 8/2002 |

OTHER PUBLICATIONS

Office Action for Chinese Patent Application No. 2003801029967 dated Apr. 4, 2008 and English translation thereof.

* cited by examiner

*Primary Examiner*—Wai-Sing Louie
(74) *Attorney, Agent, or Firm*—F. Chau & Associates, LLC

(57) ABSTRACT

A liquid crystal display, in accordance with the present invention, includes a first substrate having a thin film transistor and a first electrode formed thereon. The first electrode is electrically connected to the thin film transistor. A first insulating layer is formed on the first substrate including the thin film transistor and the first electrode and a window is formed in the first insulating layer, the window exposing a predetermined region of the first electrode. A second electrode is provided on the first insulating layer and electrically connected to the first electrode. A second substrate includes a third electrode formed thereon. A first gap is formed between a surface of the third electrode and a surface of the predetermined region of the first electrode, and a second gap is formed between the surface of the third electrode and a surface of the second electrode. A liquid crystal layer is interposed between the first gap and the second gap. Other embodiments are included as well as methods for forming the liquid crystal display of the present invention.

20 Claims, 20 Drawing Sheets

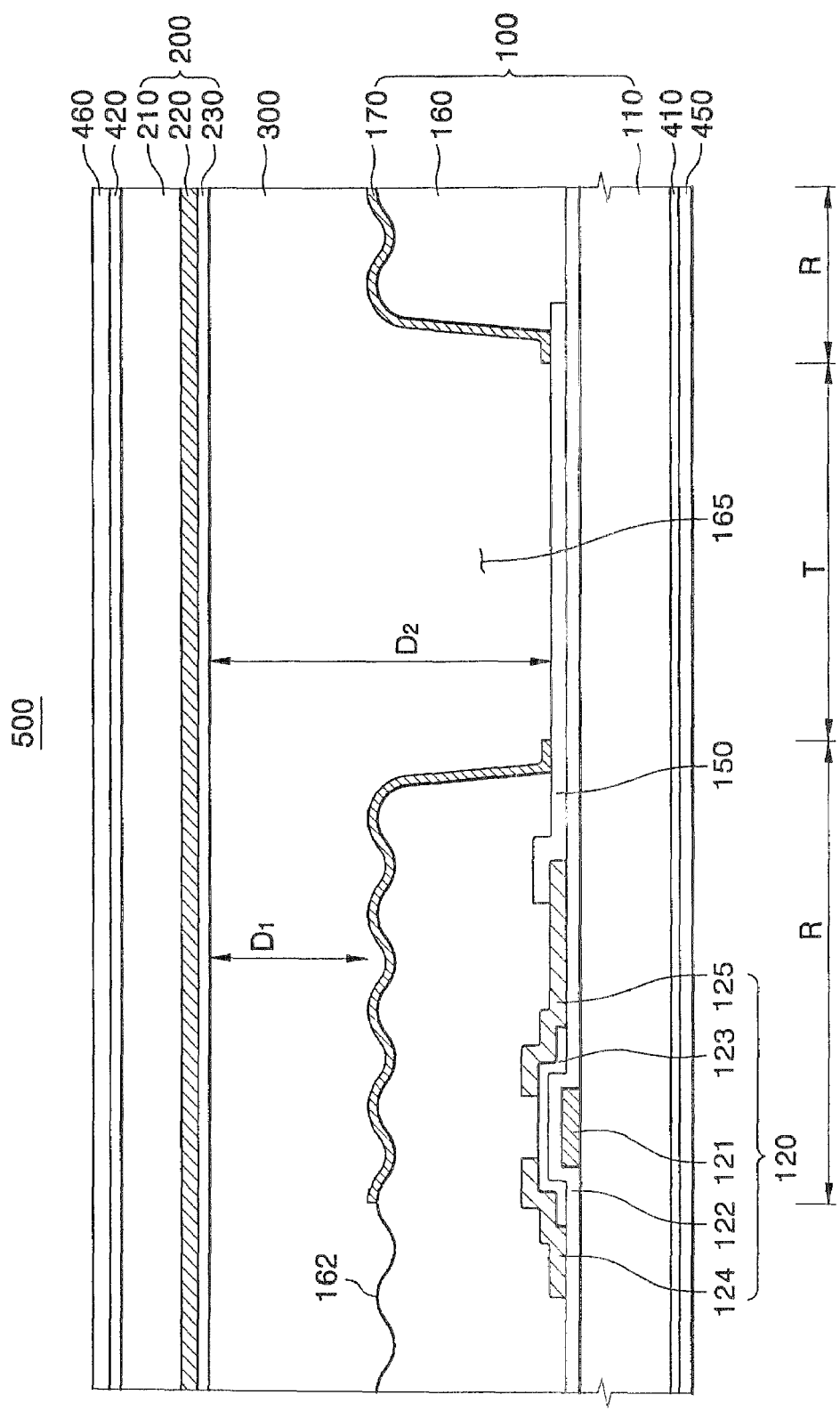

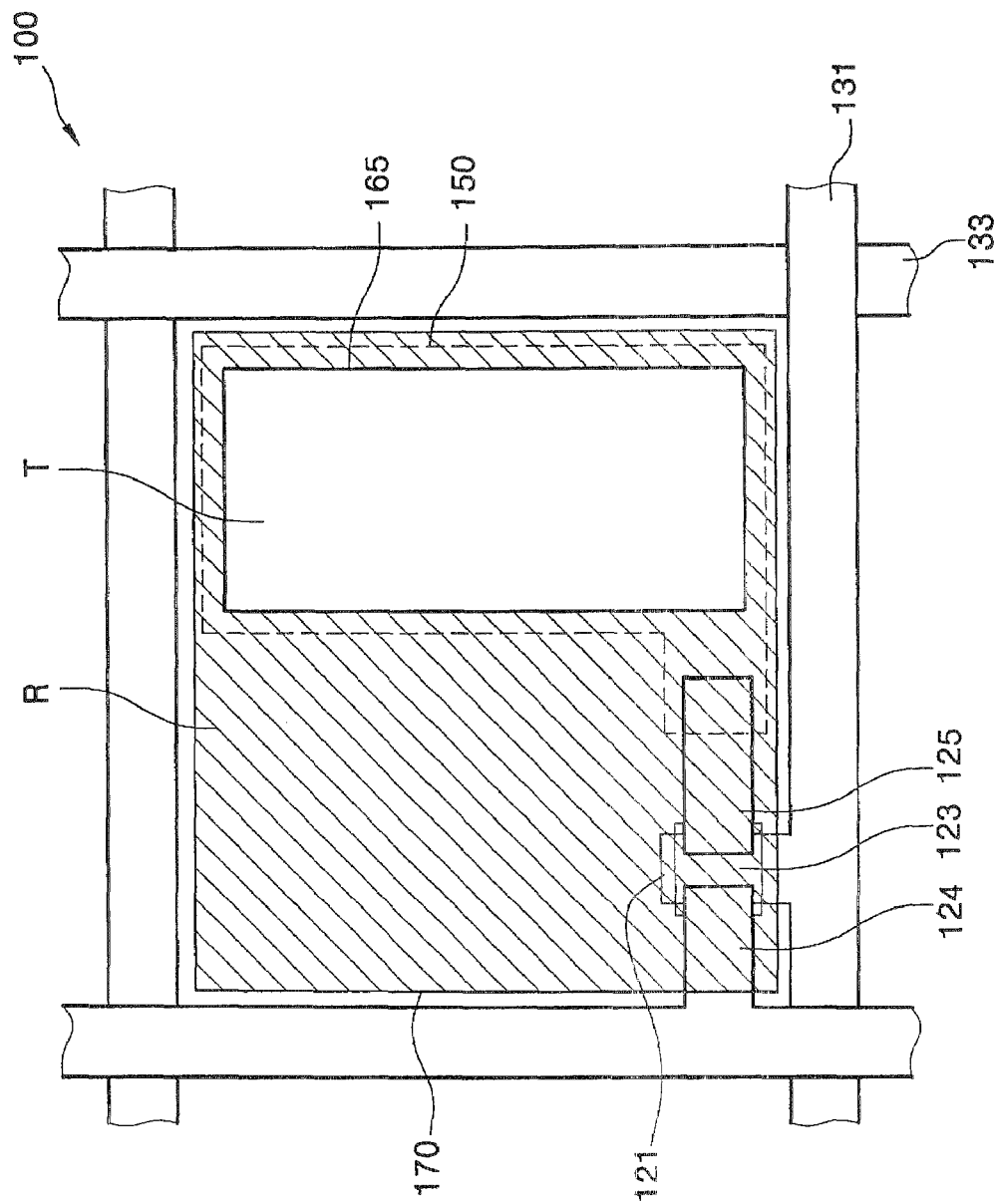

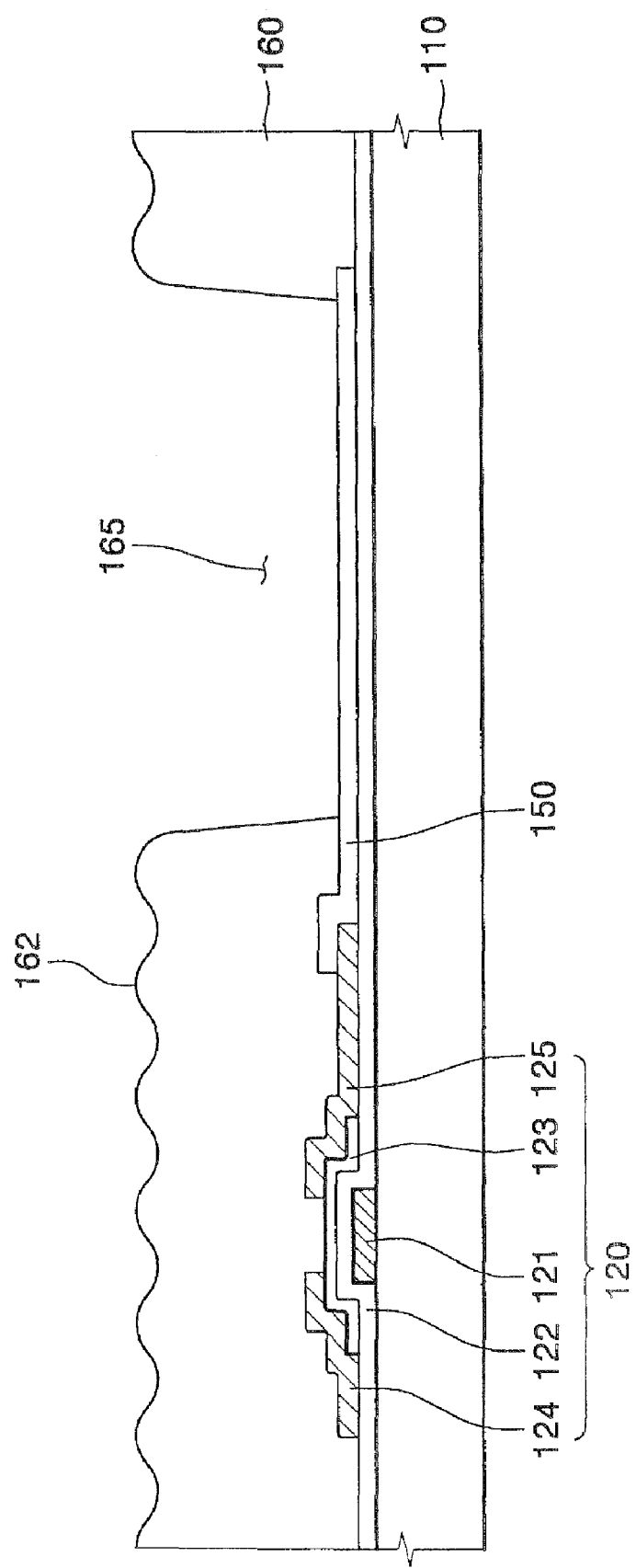

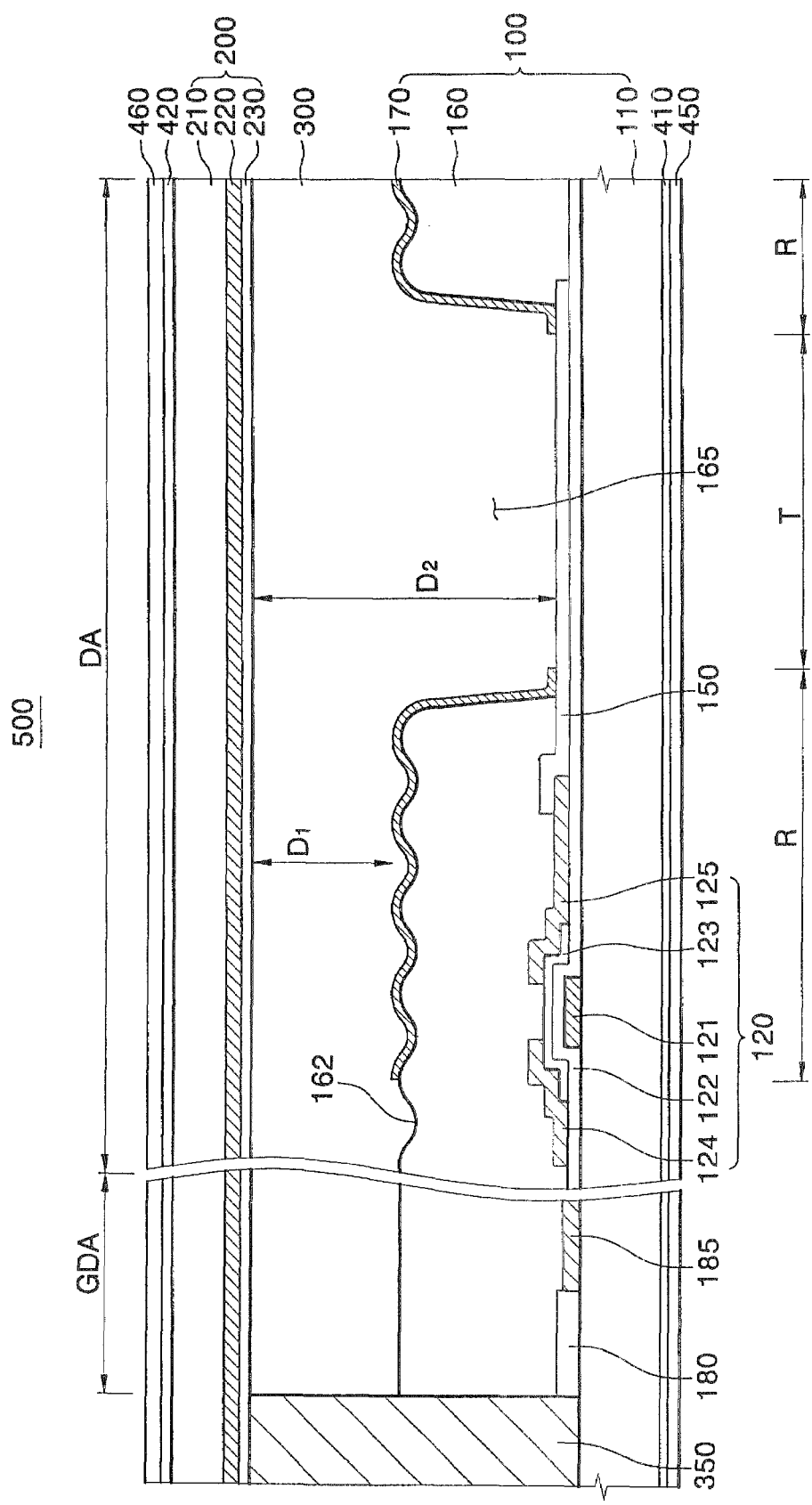

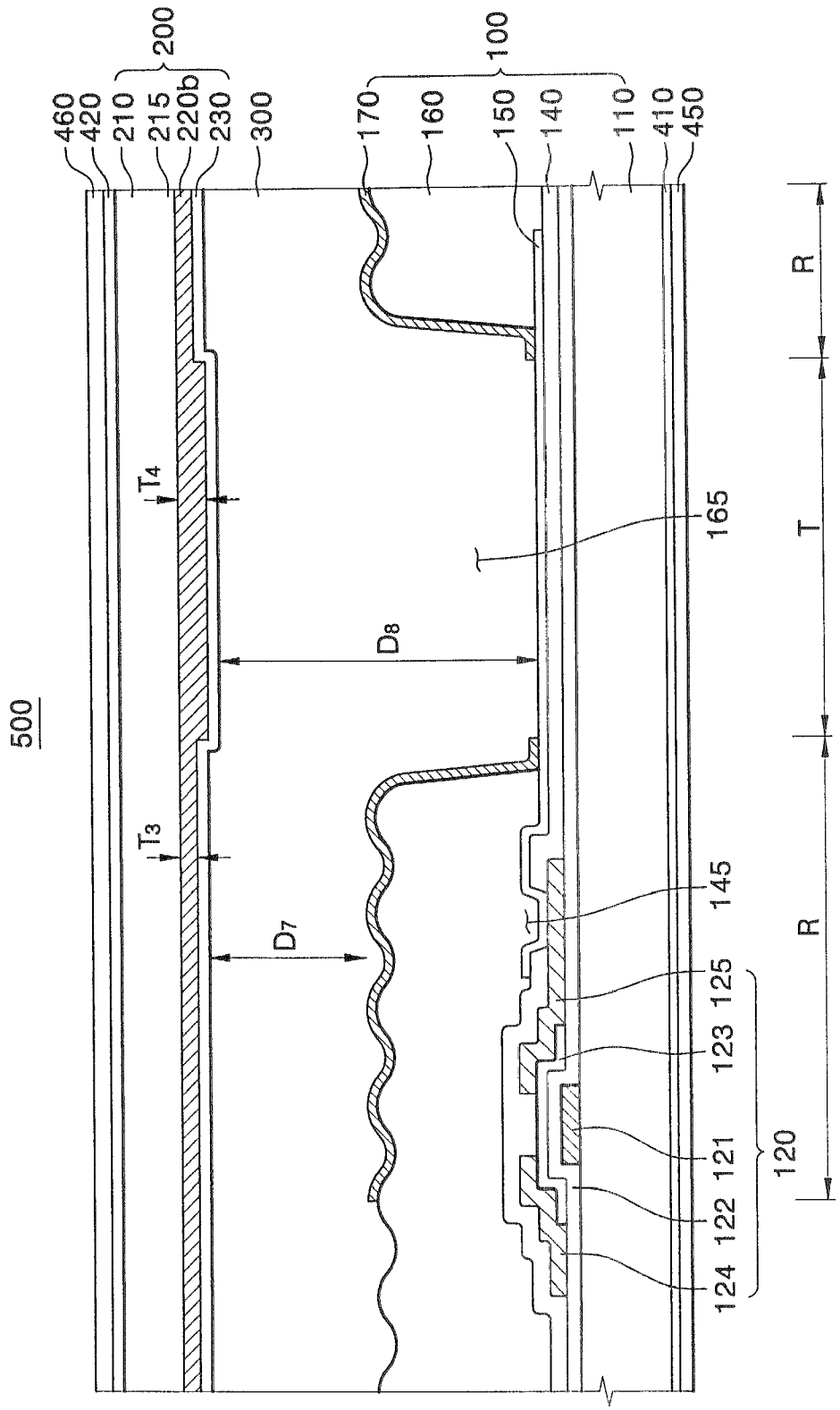

LIQUID CRYSTAL DISPLAY DEVICE HAVING A THIN FILM TRANSISTOR SUBSTRATE WITH A MULTI-CELL GAP STRUCTURE AND METHOD OF MANUFACTURING SAME

CROSS-REFERENCE TO RELATED APPLICATIONS

This application is a continuation of U.S. patent application Ser. No. 10/727,216, filed on Dec. 3, 2003, now U.S. Pat. No. 7,223,999, which claims priority to Korean Patent Application Nos. 2002-77346, filed on Dec. 6, 2002, 2003-1107, filed on Jan. 8, 2003 and 2003-7359, filed on Feb. 6, 2003, the disclosures of which are incorporated by reference herein in their entirety.

BACKGROUND OF THE INVENTION

1. Field of the Invention

The present invention relates to a liquid crystal display device and, more particularly, to a liquid crystal display device having a thin film transistor substrate with a multi-cell gap structure, and a method of manufacturing same.

2. Description of the Related Art

The liquid crystal display is a common type of display seen in a variety of portable electronic products, such as notebook computers and in some desktop computer monitors. Liquid crystal displays are lightweight, consume low power and are capable of outputting images having high resolution.

Liquid crystal displays generally consist of a pair of panels or substrates that include electrodes and polarizers, and a liquid crystal layer interposed between the panels. The liquid crystal layer is disposed between electrodes on opposing panels, which apply a voltage across the liquid crystal layer. Variations in the applied voltage alter the molecular orientation of the liquid crystal layer, resulting in different images that are displayed. The gap between the electrodes that is filled by the liquid crystal layer is known as the cell gap.

Liquid crystal display devices have been classified into transmission type and reflection type, the classification depending on whether the light source is internal or external to the liquid crystal display device. The transmission type liquid crystal display device displays an image using light generated from inside the liquid crystal display device. Conversely, the reflection type liquid crystal display device displays an image using light generated from outside the liquid crystal display device.

A third type of liquid crystal display device, which uses light from both internal and external sources is also known. This liquid crystal device is appropriately referred to as a reflection-transmission type liquid crystal display device.

FIG. 1 is a sectional view showing a conventional reflection-transmission type liquid crystal display device 50. Referring to FIG. 1, the reflection-transmission type liquid crystal display device 50 includes a thin film transistor substrate 10, a color filter substrate 20 and a liquid crystal layer 30 interposed between the thin film transistor substrate 10 and the color filter substrate 20.

The thin film transistor substrate 10 includes a first substrate 11, a thin film transistor 12, an insulating layer 13 and a pixel electrode 16. The thin film transistor 12 includes a gate electrode 12a, a gate insulating layer 12b, a semiconductor layer 12c, a source electrode 12d and a drain electrode 12e. The insulating layer 13 is formed on the first substrate 11 and covers the thin film transistor 12. The insulating layer 13 is provided with a contact hole 13a for exposing the drain electrode 12e.

The pixel electrode 16 is formed on the insulating layer 13 and is electrically connected to the drain electrode 12e through the contact hole 13a. The pixel electrode 16 includes a transmission electrode 14 and a reflection electrode 15. The reflection electrode 15 is formed on the transmission electrode 14 and defines a reflection region R for reflecting external light R1. In order to define a transmission region T for transmitting internal light R2, a predetermined section of the reflection electrode 15 is removed to expose the transmission electrode 14.

The color filter substrate 20 includes a second substrate 21, a color filter layer 22 formed on the second substrate 20 and consisting of red, green and blue (R, G and B) color pixels. A common electrode 23 is formed on the color filter layer 22 and corresponds to the pixel electrode 16 of the thin film transistor substrate 10.

A first retardation plate 41 (i.e., an optical element that produces, for example, full, half or quarter wave phase changes of polarized light) and a first polarizing plate 45 are provided at a lower portion of the thin film transistor substrate 10, and a second retardation plate 42 and a second polarizing plate 46 are positioned at an upper portion of the color filter substrate 20.

The conventional reflection-transmission type liquid crystal display device 50 reflects external light R1 through the reflection region R and transmits internal light R2 through the transmission region T, thereby displaying an image.

However, the conventional reflection-transmission type liquid crystal display device 50 has a disadvantage in that its design is based on a reflection type liquid crystal device and the characteristics of light passing through the reflection region R. Known reflection-transmission type liquid crystal display devices do not take into account the different characteristics of light passing through a transmission region T and the need for a different structure to optimize usage of this light. In known reflection-transmission type devices, the transmittance of the transmission region T is reduced by half as compared with that of the transmission type liquid crystal display devices. Optical conditions of the known reflection-transmission type liquid crystal display devices, which are designed on the basis of only the reflection region R, make it impossible to use 100% of the polarized light in the transmission region T.

Therefore, there exists a need for a design of a reflection-transmission type liquid crystal display device that takes into account the characteristics of light passing through both reflection and transmission regions and maximizes usage of light in the transmission region.

BRIEF SUMMARY OF THE INVENTION

A liquid crystal display, in accordance with the present invention, includes a first substrate having a thin film transistor and a first electrode formed thereon. The first electrode is electrically connected to the thin film transistor. A first insulating layer is formed on the first substrate including the thin film transistor and the first electrode and a window is formed in the first insulating layer, the window exposing a predetermined region of the first electrode. A second electrode is provided on the first insulating layer and electrically connected to the first electrode. A second substrate includes a third electrode formed thereon. A first gap is formed between a surface of the third electrode and a surface of the predetermined region of the first electrode, and a second gap is formed between the surface of the third electrode and a surface of the second electrode. A liquid crystal layer is interposed between the first gap and the second gap.

In alternate embodiments, the first electrode may be a transmission electrode and the window may define a transmission region for transmitting light supplied from a source internal to the device. The second electrode may be a reflection electrode and an area including the reflection electrode may define a reflection region for reflecting light supplied form a source external to the device. The first gap may be larger than the second gap. For example, the first gap may be about twice as long as the second gap. The first insulating layer may be organic and include photosensitive acryl resin. A thickness of the first insulating layer may range from about 0.5 .mu.m to about 2.5 .mu.m. The first electrode and the third electrode may include transparent conductive material, such as Indium Tin Oxide of Indium Zinc Oxide. The second electrode may include metal having high reflectivity. The liquid crystal display device of the present invention may also include a gate driving circuit region formed on the first substrate including a gate driving circuit section and the first insulating layer may extend into the gate driving circuit region over the gate driving circuit section. The gate driving circuit region may be formed of amorphous silicon and the first insulating layer may have a dielectric constant that is less than a dielectric constant of the liquid crystal layer. A second insulating layer may be formed on the first substrate, extend into the gate driving circuit region and may include a contact hole. The first electrode may be electrically connected to the thin film transistor through the contact hole. The liquid crystal display device of the present invention may further include a color filter layer and a thickness adjusting member formed on the second substrate, wherein the color filter layer is disposed on the thickness adjusting member. A predetermined part of the thickness adjusting member corresponding to the window may be removed, whereby a thickness of a first area of the color filter layer corresponding to the window is about twice a thickness of a second area of the color filter layer not corresponding to the window. The liquid crystal display device of the present invention may include the color filter layer without the thickness adjusting member, wherein a thickness of a first area of the color filter layer corresponding to the window is greater than (e.g., two times) a thickness of a second area of the color filter layer not corresponding to the window. The liquid crystal layer may be homogeneously aligned to form a liquid crystal tilting angle of about 0°.

Another liquid crystal device, in accordance with the present invention, includes a thin film transistor and an insulating layer formed on a first substrate and a first electrode formed on the insulating layer, wherein the first electrode is electrically connected to the thin film transistor. A second electrode is provided on the first electrode, wherein a predetermined portion of the second electrode is removed for exposing a predetermined portion of the first electrode. A third electrode is formed on a second electrode. A first gap is formed between a surface of the third electrode and a surface of the predetermined portion of the first electrode, and a second gap is formed between the surface of the third electrode and a surface of the second electrode. A liquid crystal layer is interposed between the first gap and the second gap.

In alternate embodiments, the first electrode may be a transmission electrode and an area including the predetermined portion of the first electrode may define a transmission region for transmitting light supplied from a source internal to the device. The second electrode may be a reflection electrode and an area including the reflection electrode may define a reflection region for reflecting light supplied from a source external to the device. The first gap may be larger than the second gap, for example, twice as long as the second gap. The first gap may less than about 3.3 μm and the second gap may be less than about 1.7 μm. The insulating layer may be organic and include photosensitive acryl resin. The first electrode and the third electrode may include transparent conductive material, such as Indium Tin Oxide or Indium Zinc Oxide. The second electrode may include metal having high reflectivity. The liquid crystal device of the present invention may further include a contact hole formed in the insulating layer, wherein the first electrode is electrically connected to the thin film transistor through the contact hole. A third gap may be formed between the surface of the third electrode and a surface of the second electrode in an area occupied by the contact hole. The third gap may include the liquid crystal layer and a relationship between sizes of the first, second and third gaps that is defined by the following: second gap<third gap≦first gap. The liquid crystal layer may be homogeneously aligned to form a liquid crystal tilting angle of about 0°.

In accordance with the present invention, a method for forming a liquid crystal display device includes the steps of forming a thin film transistor on a first substrate, patterning a first conductive layer formed on the first substrate to form a first electrode on the first substrate, wherein the first electrode is electrically connected the thin film transistor, disposing a first insulating layer on the first substrate including the thin film transistor and the first electrode, exposing a predetermined region of the first electrode by forming a window in the first insulating layer, patterning a metal layer formed on the first insulating layer to form a second electrode on the first insulating layer, wherein the second electrode is electrically connected to the first electrode, patterning a second conductive layer to form a third electrode on a second substrate, positioning the first substrate and the second substrate to form a first gap between a surface of the third electrode and a surface of the predetermined region of the first electrode and a second gap between the surface of the third electrode and a surface of the second electrode, and interposing a liquid crystal layer between the first gap and the second gap.

In alternate methods, the first electrode may be a transmission electrode and the window may define a transmission region for transmitting light supplied from a source internal to the device. The second electrode may be a reflection electrode and an area including the reflection electrode may define a reflection region for reflecting light supplied from a source external to the device. The first gap may be larger than the second gap. For example, the first gap may be about twice as long as the second gap. The first insulating layer may be organic and include photosensitive acryl resin. A thickness of the first insulating layer may range from about 0.5 μm to about 2.5 μm. One of the first conductive layer and second conductive layer may be transparent and include at least one of Indium Tin Oxide and Indium Zinc Oxide. The metal layer may have high reflectivity. The method may also include providing a gate driving circuit region including a gate driving circuit section on the first substrate and extending the first insulating layer into the gate driving circuit region over the gate driving circuit section. The gate driving circuit region may be formed of amorphous silicon and the first insulating layer may have a dielectric constant that is less than a dielectric constant of the liquid crystal layer. The method may also include disposing a second insulating layer on the first substrate, and extending the second insulating layer into the gate driving circuit region. The second insulating layer may include a contact hole and the first electrode may be electrically connected to the thin film transistor through the contact hole. The method may further comprise forming a thickness adjusting member on the second substrate, and disposing a color filter layer is on the thickness adjusting member. A predetermined part of the thickness adjusting member corresponding to the window may be removed, whereby a thickness of a first area of the color filter layer corresponding to the window is about twice a thickness of a second area of the color filter layer not corresponding to the window. The method may further include forming the color filter layer on the second substrate without the thickness adjusting member, wherein a thickness of a first area of the color filter layer corresponding to the window is greater than (e.g., two times) a thickness of a second area of the color filter layer not corresponding to the window. The liquid crystal layer may be homogeneously aligned to form a liquid crystal tilting angle of about 0°.

Another method for forming a liquid crystal display device includes forming a thin film transistor on a first substrate, disposing an insulating layer on the first substrate including the thin film transistor, patterning a first conductive layer to form a first electrode on the insulating layer, wherein the first electrode is electrically connected to the thin film transistor, patterning a metal layer formed on the first electrode to form a second electrode, wherein a predetermined portion of the second electrode is removed for exposing a predetermined portion of the first electrode, patterning a second conductive layer to form a third electrode on a second substrate, positioning the first substrate and the second substrate to form a first gap between a surface of the third electrode and a surface of the predetermined portion of the first electrode and a second gap between the surface of the third electrode and a surface of the second electrode, and interposing a liquid crystal layer between the first gap and the second gap.

In other methods, the first electrode may be a transmission electrode and an area including the predetermined portion of the first electrode may define a transmission region for transmitting light supplied from a source internal to the device. The second electrode may be a reflection electrode and an area including the reflection electrode may define a reflection region for reflecting light supplied from a source external to the device. The first gap may be larger than the second gap. For example, the first gap may be twice as long as the second gap. The method may further include forming a gate driving circuit region on the first substrate and the gate driving circuit region may be formed from amorphous silicon.

BRIEF DESCRIPTION OF THE DRAWINGS

Preferred embodiments of the invention can be understood in more detail from the following description taken in conjunction with the accompanying drawings in which:

FIG. 2 is a sectional view showing a reflection-transmission type liquid crystal display device according to a first embodiment of the present invention;

FIG. 3 is a plan view of a thin film transistor substrate shown in FIG. 2;

FIGS. 4A to 4D are sectional views the thin film transistor substrate shown in FIG. 2 for illustrating a method of manufacturing same;

FIG. 5 is a sectional view showing a reflection-transmission type liquid crystal display device according to a second embodiment of the present invention;

FIG. 11B is a sectional view showing a reflection-transmission type liquid crystal display device according to a sixth embodiment of the present invention;

DETAILED DESCRIPTION OF THE INVENTION

Figure 1:
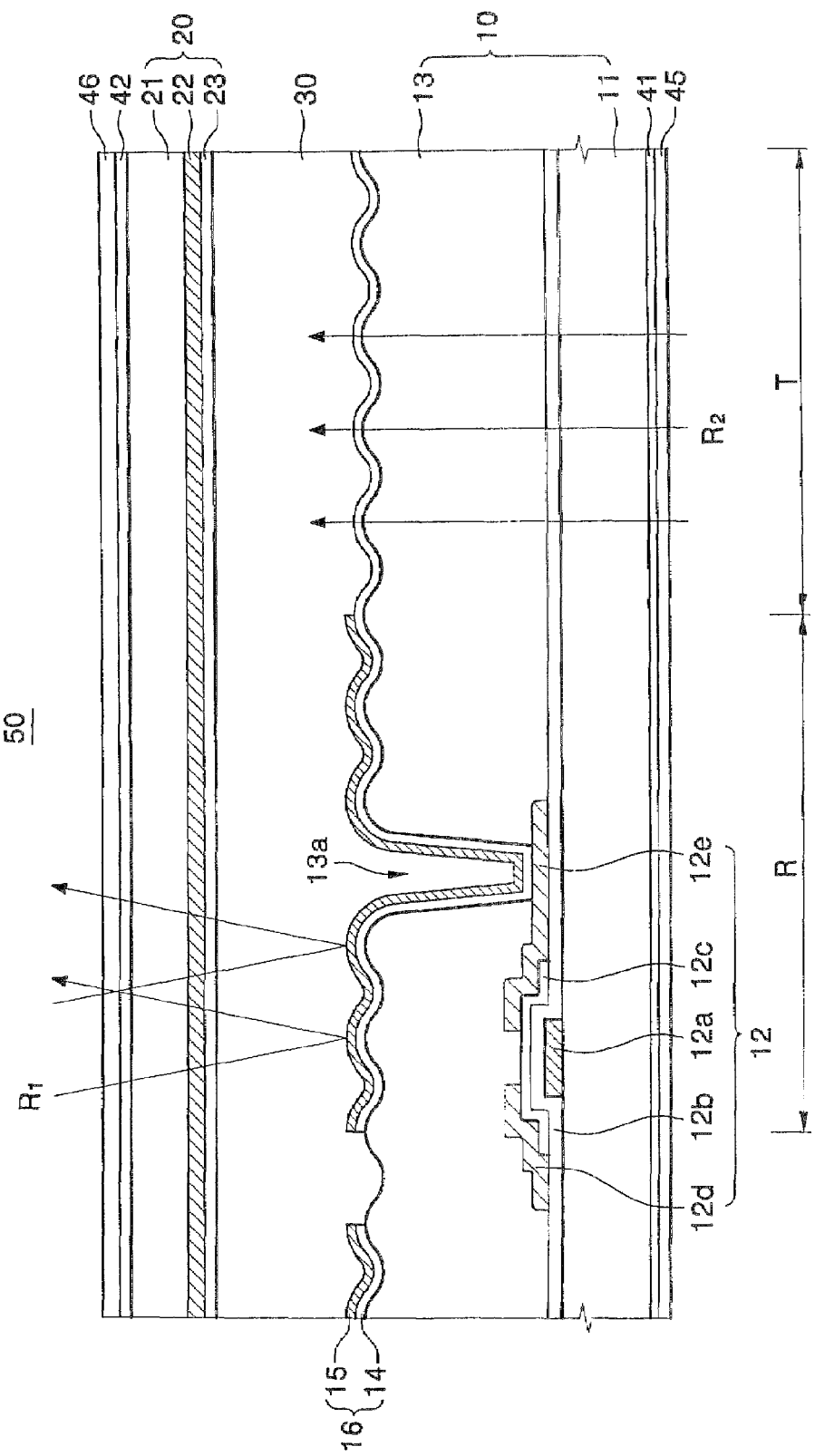
FIG. 1 is a sectional view showing a conventional reflection-transmission type liquid crystal display device.

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. It will also be understood that when a layer or substrate is referred to as being "on" another layer or substrate, it can be directly on the other layer or substrate or intervening layers or substrates may also be present.

The present invention relates to liquid crystal displays, and more particularly to a liquid crystal display device having a thin film transistor substrate with a multi-cell gap structure, and a method of manufacturing same for maximizing usage of light in a transmission region of a reflection-transmission type liquid crystal display device.

According to the present invention, a window formed by removing a predetermined portion of an organic insulating layer and a reflection electrode formed on the organic insulating layer are provided to define a transmission region and a reflection region, respectively.

A cell gap of the transmission region is different from a cell gap of the reflection region so that loss of light in the transmission region can be prevented, thereby improving the transmittance of light. In addition, transmittance is further improved by providing a liquid crystal layer that is homogeneously aligned to form a zero degree liquid crystal tilting angle.

Referring now to the drawings in which like numerals represent the same or similar elements, FIG. 2 is a sectional view showing a reflection-transmission type liquid crystal display device according to a first embodiment of the present invention. FIG. 3 is a plan view of a thin film transistor substrate shown in FIG. 2.

Referring to FIGS. 2 and 3, a reflection-transmission type liquid crystal display device 500 according to a first embodiment of the present invention includes a thin film transistor substrate 100, a color filter substrate 200 oppositely coupled to the thin film transistor substrate 100, and a liquid crystal layer 300 interposed between the thin film transistor substrate 100 and the color filter substrate 200.

The thin film transistor substrate 100 includes a first substrate 110, a thin film transistor 120, a transistor electrode 150, an organic insulating layer 160 and a reflection electrode 170. The thin film transistor 120 includes a gate electrode 121 branched from a gate line 131 extending in a first direction, and source and drain electrodes 124 and 125 branched from a data line 133 extending in a second direction perpendicular to the first direction. A gate insulating layer 122 is deposited on the entire surface of the first substrate 110 so as to protect the gate electrode 121, and a semiconductor layer 123 is formed on the gate insulating layer 122 in an area over the gate electrode 121.

The transmission electrode 150 includes transparent conductive material, for example, indium-tin-oxide (ITO) or idium-zinc-oxide (IZO). The transmission electrode 150 covers one side of the drain electrode 125 and is formed on the gate insulating layer 122 over a predetermined area.

The organic insulating layer 160 includes photosensitive acryl resin and is provided on the transmission electrode 150. The thickness of the organic insulating layer 160 ranges from about 0.5 to about 2.5 µm. The organic insulating layer 160 includes a window 165 exposing a predetermined region of the transmission electrode 150. The window 165 may be formed by removing a portion of the organic insulating layer 160 to expose the predetermined region of the transmission electrode 150. An embossing pattern 162 is formed on an upper surface of the organic insulating layer 160.

The window 165 defines a transmission region T for transmitting internal light supplied from a light generating device (not shown) provided in the reflection-transmission type liquid crystal display device 500.

The reflection electrode 170 made of metal having high reflectivity, for example, such as Al, Ag, and Cr, is formed on the organic insulating layer 160. The reflection electrode 170 extends from an upper surface of the organic insulating layer 160 to an edge of the transmission electrode 150, which is exposed through the window 165, so as to be electrically connected to the transmission electrode 150 through the window 165. The reflection electrode 170 formed on the organic insulating layer 160 defines a reflection region R for reflecting external light incident from a light source external to the reflection-transmission type liquid crystal display device 500.

The color filter substrate 200 includes a second substrate 210, a color filter layer 220 and a common electrode 230. The color filter layer 220 is provided on the second substrate 210 and includes a plurality of red, green and blue (R, G and B) color pixels, which are uniformly aligned. The common electrode 230 is provided on the color filter layer 220 opposite the transmission electrode 150 and the reflection electrode 170 of the thin film transistor substrate 100. Like the transmission electrode 150, the common electrode 230 includes ITO or IZO.

The crystal layer 300 has a first thickness D1 corresponding to the reflection region R and a second thickness D2 corresponding to the transmission region T. The ratio of second thickness D2 to the first thickness D1 is approximately 2:1. As a result, the cell gap in the transmission region T is approximately twice the cell gap in the reflection region R.

A first retardation plate 410 and a first polarizing plate 450 are provided as a lower portion of the thin film transistor substrate 100, and a second retardation plate 420 and a second polarizing plate 460 are positioned at an upper portion of the color filter substrate 200. The polarizing axis of the first polarizing plate 450 is perpendicular to a polarizing axis of the second polarizing plate 460. The first and second retardation plates 410 and 420 may be quarter retardation plates (λ/4), which produce a quarter wave phase change of polarized light.

Since the reflection region R and the transmission region T of the reflection-transmission type liquid crystal display device 500 are operated in a multi-cell gap mode, in which the cell gap of the reflection region R is less than the cell gap of the transmission region T, light loss can be prevented in the transmission region T, and transmittance in the transmission region T can be improved.

FIGS. 4A to 4D are sectional views of the thin film transistor substrate 100 shown in FIG. 2 for illustrating a method of manufacturing same. In accordance with a method of manufacturing the thin film transistor substrate 100, according to an embodiment of the invention, the gate line 131 (shown in FIG. 3) and the gate electrode 121, branched from the gate line 131, are formed by patterning a first metal layer formed on the first substrate 110.

Figure 4A:
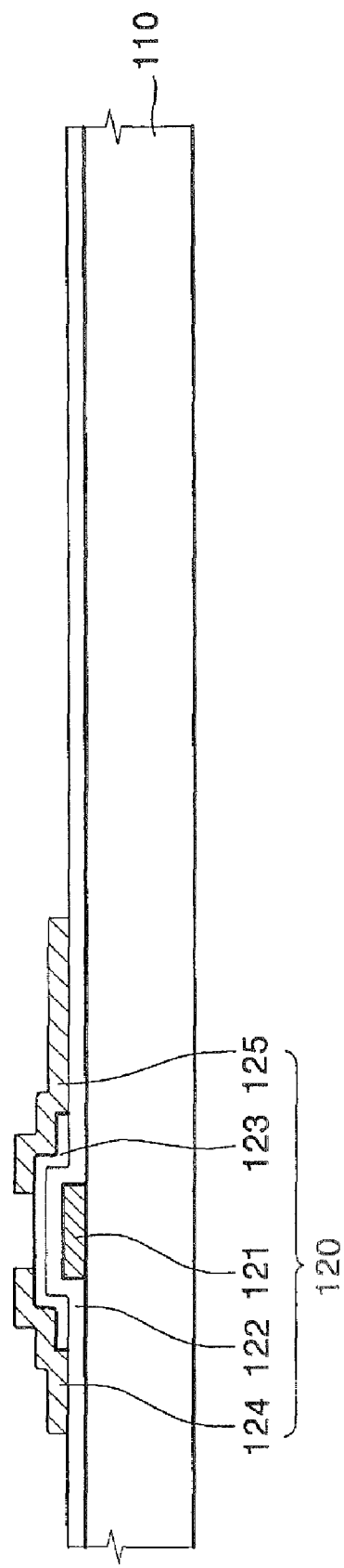

Referring to FIG. 4A, the gate insulating layer 122 covers the gate line 131 and the gate electrode 12, and the semiconductor layer 123 is formed on the gate insulating layer 122 in an area above the gate electrode 121.

The date line 133 (shown in FIG. 3) and source and drain electrodes 124 and 125, branched from the data line 133, are formed by patterning a second metal layer formed on the first substrate 110. As a result, the thin film transistor 120 is formed on the first substrate 110.

Figure 4B:
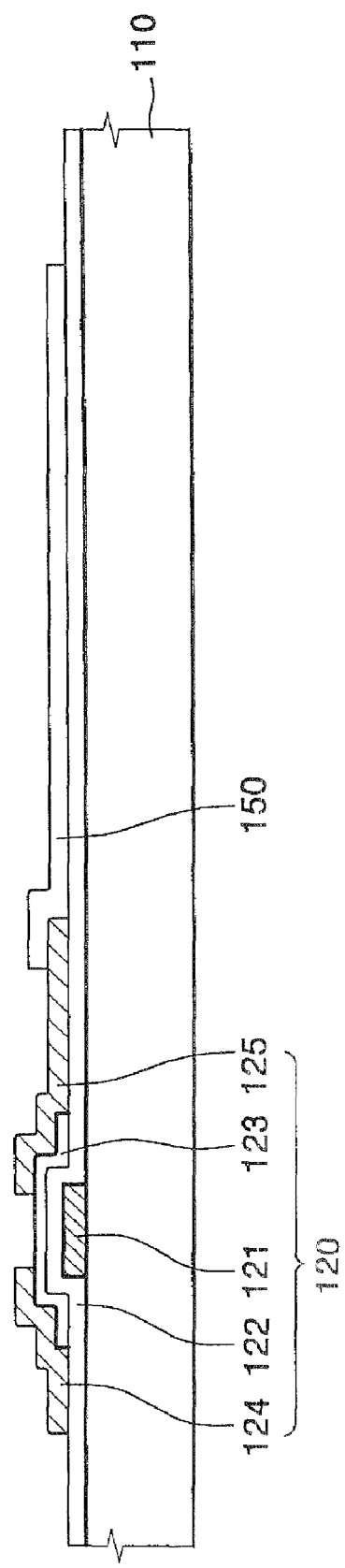

Referring to FIG. 4B, the transmission electrode 150 is formed by patterning a transparent conductive layer including ITO or IZO formed on the first substrate 110 having the thin film transistor 120 thereon. The transmission electrode 150 is formed on the gate insulating layer 122, has a predetermined area and is electrically connected to the drain electrode 125.

Referring to FIG. 4C, the organic insulating layer 160 is formed on the gate insulating layer 122. The organic insulating layer 160 is formed by a photolithography process, wherein a photosensitive photoresist having a predetermined thickness is used. The photoresist is formed on the first substrate 110. The organic insulating layer 160 is located on the left and right sides of the thin film transistor substrate 100 and includes an embossing pattern 162 formed on the upper surface thereof. A window 165 is formed in the organic insulating layer 160 to expose a predetermined region of the transmission electrode 150. To form the window 165, a predetermined part of the organic insulating layer 160 corresponding to the desired region of the transmission electrode 150 to be exposed may be removed.

Figure 4D:
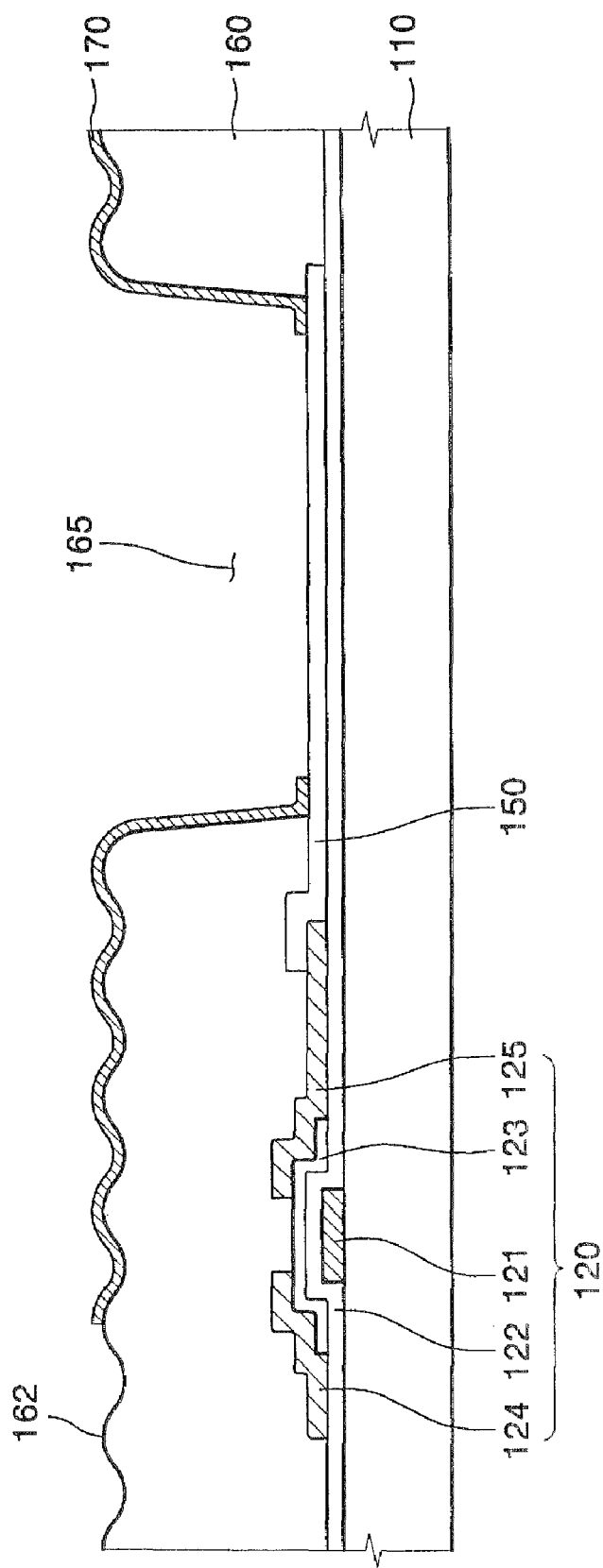

Referring to FIG. 4D, the reflection electrode 170 is formed on the organic insulating layer 160 by patterning a third metal layer having high reflectivity. The third metal layer may be made from, Al, Ag, and Cr, for example. The reflection electrode 170 is electrically connected to the transmission electrode 150 along an edge of the transmission electrode 150 exposed through the window 165.

FIG. 5 is a sectional view showing a reflection-transmission type liquid crystal display device 500 according to a second embodiment of the present invention.

Referring to FIG. 5, a reflection-transmission type liquid crystal display device 500 according to the second embodiment of the present invention includes a thin film transistor substrate 100, a color filter substrate 200 oppositely coupled to the thin film transistor substrate 100, and a liquid crystal layer 300 interposed between the thin film transistor substrate 100 and the color filter substrate 200.

The reflection-transmission type liquid crystal display device 500 has a pixel region DA, on which an image is displayed, and a gate driving circuit region GDA adjacent to the pixel region DA provided in a peripheral region. As shown in FIG. 5, the gate driving circuit region GDA is formed on the same substrate (i.e., first substrate 110) as the pixel region DA, thereby eliminating the need for a separate gate driver integrated circuit (IC). The gate driving circuit region GDA is preferably formed from amorphous silicon. The pixel region DA and the gate driving circuit region GDA are provided on one side of a sealant 350 for coupling the thin film transistor substrate 100 to the color filter substrate 200.

The pixel region DA of the reflection-transmission type liquid crystal display device 500 shown in FIG. 5 is similar to the pixel region of the reflection-transmission type liquid crystal display device 500 shown in FIG. 2, and will not be described in detail.

A gate driving circuit section 180 is provided in the gate driving circuit region GDA. The gate driving circuit section 180 is connected to a gate line formed in the pixel region DA through connection wiring 185 so as to supply a gate driving signal (e.g., a driving voltage) to the gate line.

The organic insulating layer 160 formed in the pixel region DA extends to the gate driving circuit region GDA so as to cover the gate driving circuit section 180. As a result, an organic insulating layer 160 with a dielectric constant lower than a dielectric constant of the liquid crystal layer 300 may be provided between the gate driving circuit section 180 and the common electrode 230. Since capacitance is generally proportional to the dielectric constant, parasitic capacitance created between the gate driving circuit section 180 and the common electrode 230 can be reduced by replacing a predetermined portion of the liquid crystal layer 300 with the organic insulating layer 160 having a lower dielectric constant. Accordingly, a gate driving signal supplied to a gate line of the pixel region DA from the gate driving circuit section 180 is prevented from being distorted by parasitic capacitance.

Figure 6:
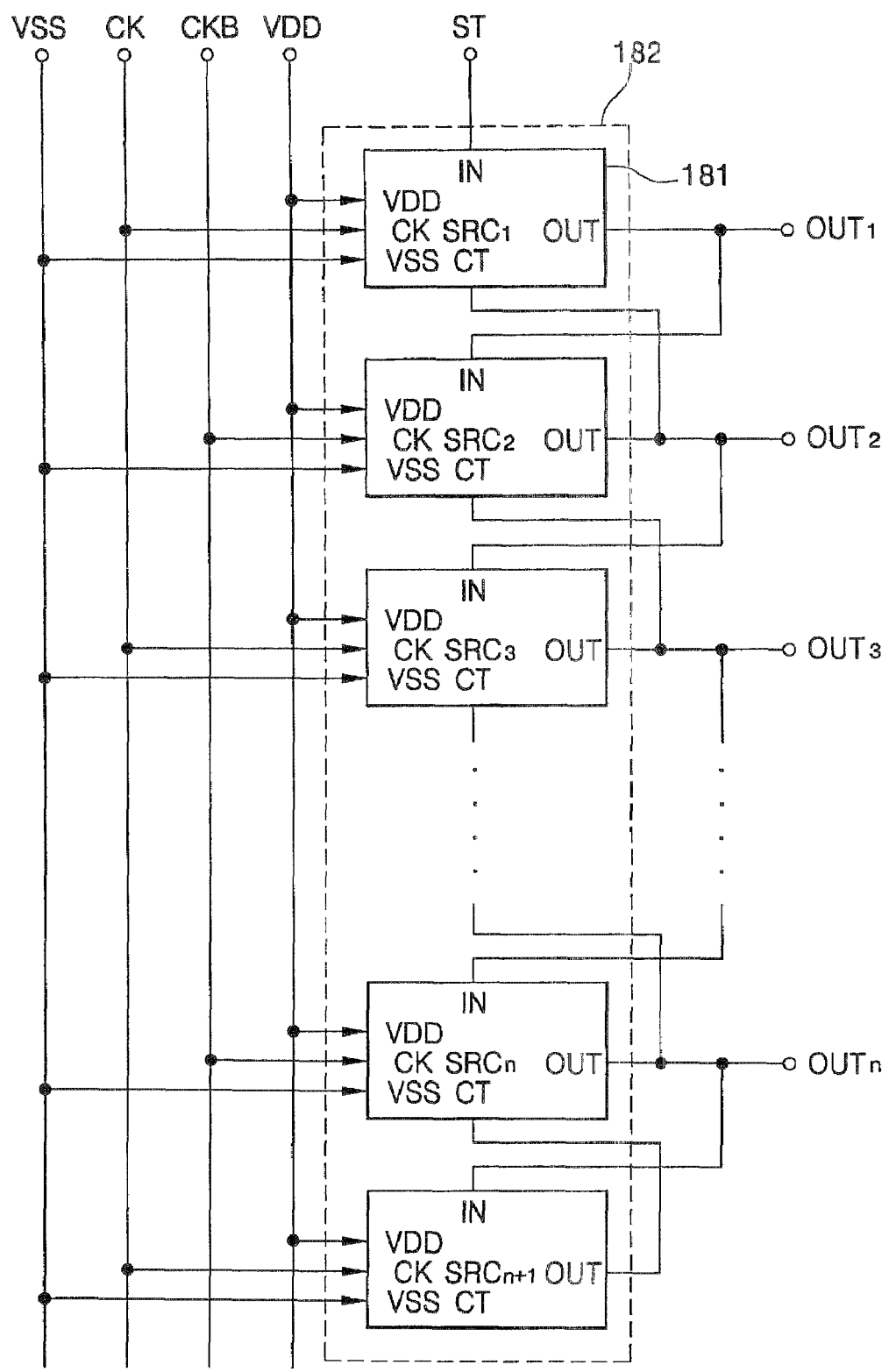
FIG. 6 is a block diagram showing a gate driving circuit section shown in FIG. 5.
Figure 7:
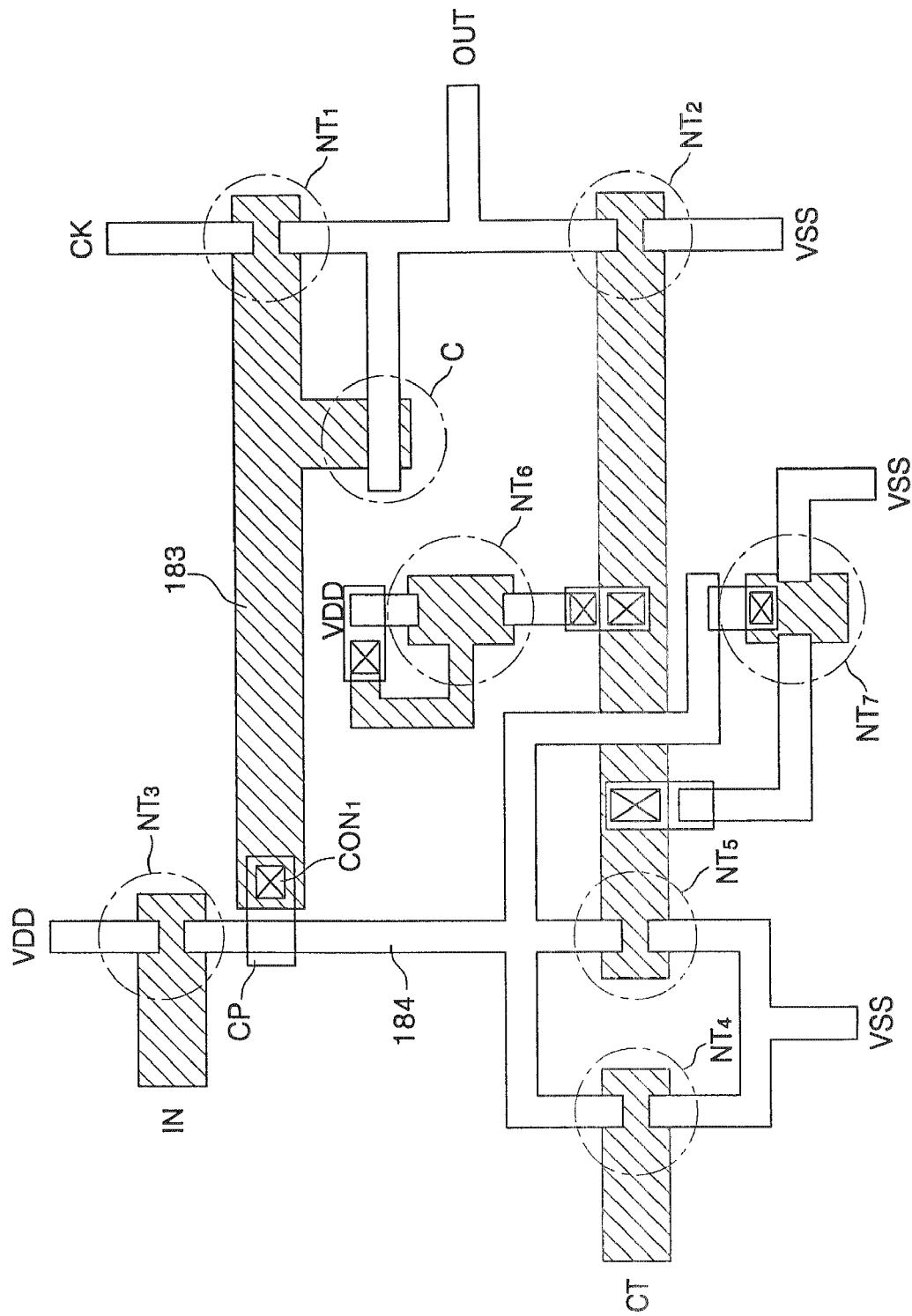
FIG. 7 is a schematic view showing a structure of a stage of the gate driving circuit section shown in FIG. 6.

FIG. 6 is a block diagram showing the gate driving circuit section 180 shown in FIG. 5. FIG. 7 is a schematic view showing a structure of a stage 181 of the gate driving circuit section shown in FIG. 6. Referring to FIG. 6, the gate driving circuit section 180 includes a shift resistor 182 having a plurality of stages 181, which are sequentially connected to each other. In the shift resister 182, an output terminal OUT of a present stage 181 is connected to an input terminal IN of a next stage 181 and a control terminal CT of a previous stage 181.

Referring to FIG. 7, each stage 181 has first to seventh transistors NT1 to NT7 and a capacitor C. Each of the first to seventh transistors NT1 to NT7 includes a first conductive pattern 183 and a second conductive pattern 184 provided in different layers. The first conductive pattern 183 is electrically connected to the second conductive pattern 184 in order to form the plurality of transistors NT1 to NT7. For example, the second conductive pattern 184 forming a third transistor NT3 is electrically connected to the first conductive pattern 183 forming the first transistor NT1 and the capacitor C.

The first conductive pattern 183 is electrically connected to the second conductive pattern 184 through a conductive pad CP including ITO or IZO. A contact hole CON1 may be used to electrically connect the conductive pad CP to the first and second conductive patterns 183 and 184. A plurality of conductive pads CP including ITO or IZO may be provided on a surface of the gate driving circuit section 180. Since the organic insulating layer 160 (shown in FIG. 5) extends to the gate driving circuit region GDA to cover the gate driving circuit section 180, parasitic capacitance created between the common electrode 230 and the conductive pads CP of the gate driving circuit section 180 can be reduced.

Although the stage 181 including the first to seventh transistors NT1 to NT7 is shown in FIG. 7, the structure of each stage 181 can vary. A plurality of conductive pads CP may be provided in each stage 181 regardless of the specific structure of each stage 181.

Figure 8:
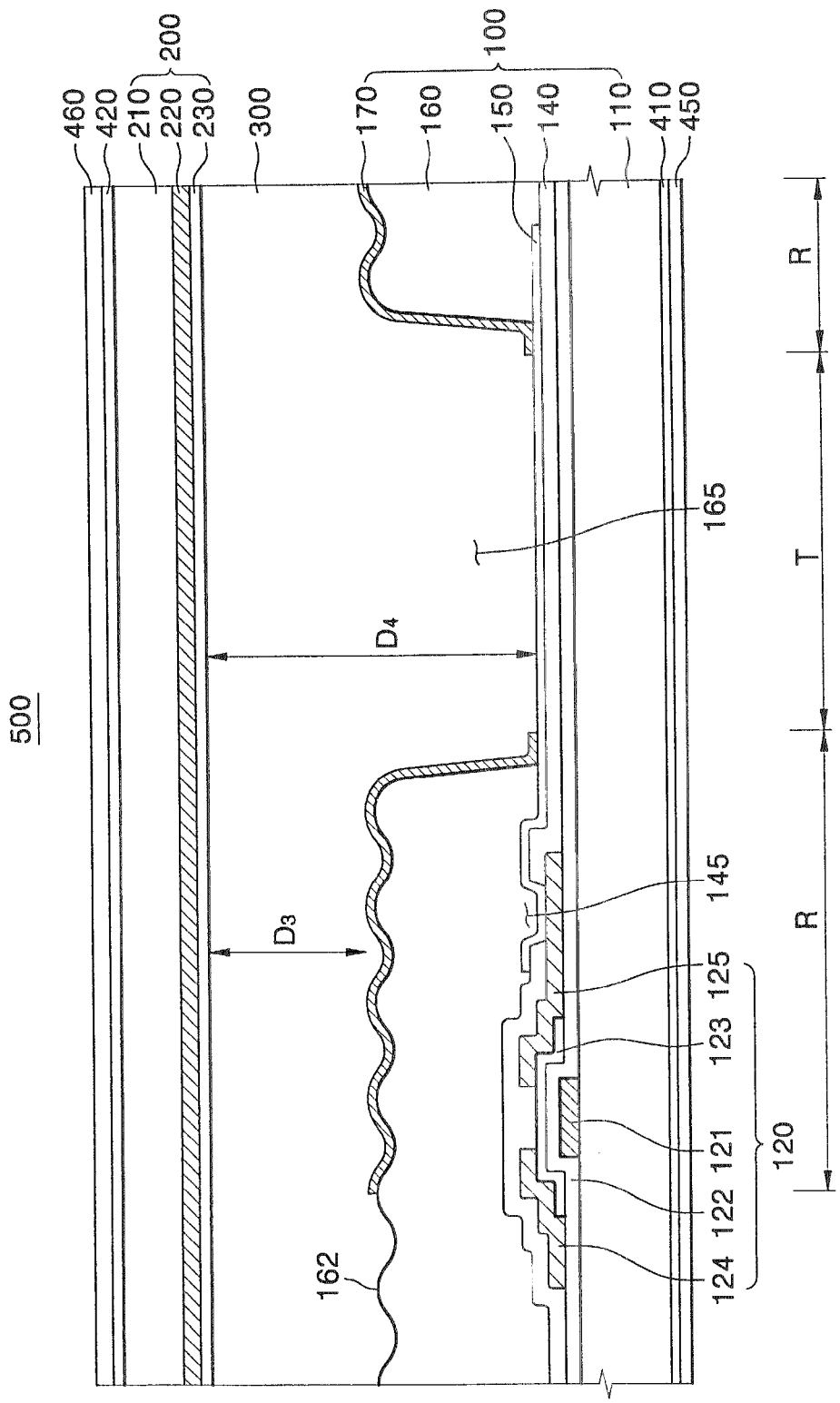
FIG. 8 is a sectional view showing a reflection-transmission type liquid crystal display device according to a third embodiment of the present invention.

FIG. 8 is a sectional view showing a reflection-transmission type liquid crystal display device 500 according to a third embodiment of the present invention. Referring to FIG. 8, a reflection-transmission type liquid crystal display device 500 according to a third embodiment of the present invention includes a thin film transistor substrate 100, a color filter substrate 200 oppositely coupled to the thin film transistor substrate 100, and a liquid crystal layer 300 interposed between the thin film transistor substrate 100 and the color filter substrate 200.

The thin film transistor substrate 100 includes a first substrate 110, a thin film transistor 120 provided on the first substrate 110, an inorganic insulating layer 140, a transmission electrode 150, an organic insulating layer 160 and a reflection electrode 170.

The inorganic insulating layer 140 is formed on an entire surface of the first substrate 110 in order to protect the thin film transistor 120. The inorganic insulating layer 140 includes transparent inorganic substances, for example, silicon nitride SiNx or chrome oxide $Cr_2O_3$.

A contact hole 145 is formed in the inorganic insulating layer 140 so as to expose the drain electrode 125 of the thin film transistor 120. The transmission electrode 150 consisting of transparent conductive material, such as, for example, ITO or IZO, is provided on the inorganic insulating layer 140 and is electrically connected to the drain electrode 125 through the contact hole 145.

The organic insulating layer 160 includes photosensitive acryl resin, is provided on the transmission electrode 150 and covers a connection part between the drain electrode 125 and the transmission electrode 150. As a result, the organic insulating layer 160 also covers the contact hole 145. The organic insulating layer 160 has thickness from about 0.5 to about 2.5 μm.

In addition, an embossing pattern 162 is formed on an upper surface of the organic insulating layer 160. The organic insulating layer 160 also includes a window 165 exposing a predetermined region of the transmission electrode 150. The window 165 may be formed by removing a predetermined region of the organic insulating layer 160, such that the transmission electrode 150 is exposed, thereby defining a transmission region T.

The reflection electrode 170 is made of metal having high reflectivity, such as, for example, Al, Ag, and Cr, and is provided on the organic insulating layer 160. The reflection electrode 170 extends from an upper surface of the organic insulating layer 160 to an edge of the transmission electrode 150, which is exposed by the window 165, so as to be electrically connected to the transmission electrode 150. The reflection electrode 170 defines a reflection region R for reflecting light incident from an exterior.

The color filter substrate 200 has a function and structure that are similar to those of the color filter substrate 200 shown in FIG. 2, and will not be described further below.

The liquid crystal layer 300 has a third thickness D3 corresponding to the reflection region R and a fourth thickness D4 corresponding to the transmission region T. The ratio of the fourth thickness D4 to the third thickness D3 is approximately 2:1.

A first retardation plate 410 and a first polarizing plate 450 are provided at a lower portion of the thin film transistor substrate 100, and a second retardation plate 420 and a second polarizing plate 460 are positioned at an upper portion of the color filter substrate 200. A polarizing axis of the first polarizing plate 450 is perpendicular to a polarizing axis of the second polarizing plate 460. The first and second retardation plates 410 and 420 may be quarter retardation plates ($\lambda$/4), which produce a quarter wave phase change of polarized light.

Since the reflection region R and the transmission region T of the reflection-transmission type liquid crystal display device 500 are operated in a multi-cell gap mode, in which a cell gap of the reflection region R is less than a cell gap of the transmission region T, light loss can be prevented in the transmission region T and transmittance in the transmission region T can be improved.

Figure 9A:
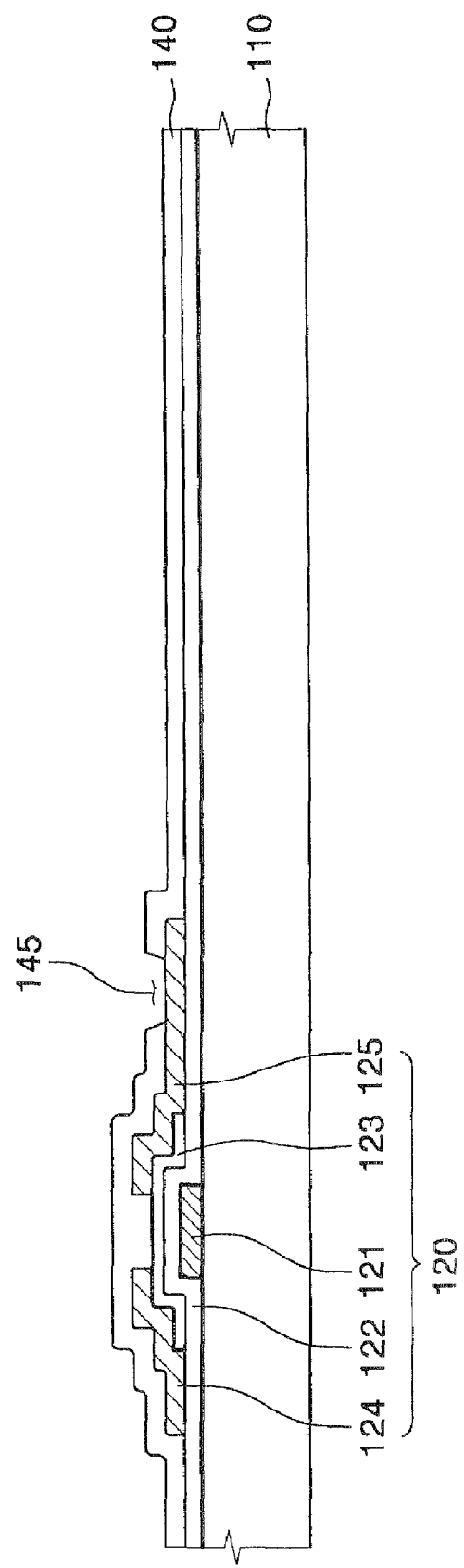
FIGS. 9A to 9D are sectional views of the thin film transistor substrate shown in FIG. 8 for illustrating a method of manufacturing same.

FIGS. 9A to 9D are sectional views of the thin film transistor substrate 100 shown in FIG. 8 for illustrating a method of manufacturing same. Referring to FIG. 9A, the thin film transistor 120 is formed on the first substrate 110. A method for forming the thin film transistor 120 has already been described with reference to FIG. 4A, and will not be further described.

An inorganic insulating layer 140 is formed on an entire surface of the first substrate 110 in order to protect the thin film transistor 120 formed on the first substrate 110. In addition, a contact hole 145 is formed in the inorganic insulating layer 140 so as to expose the drain electrode 125 of the thin film transistor 120.

Figure 9B:
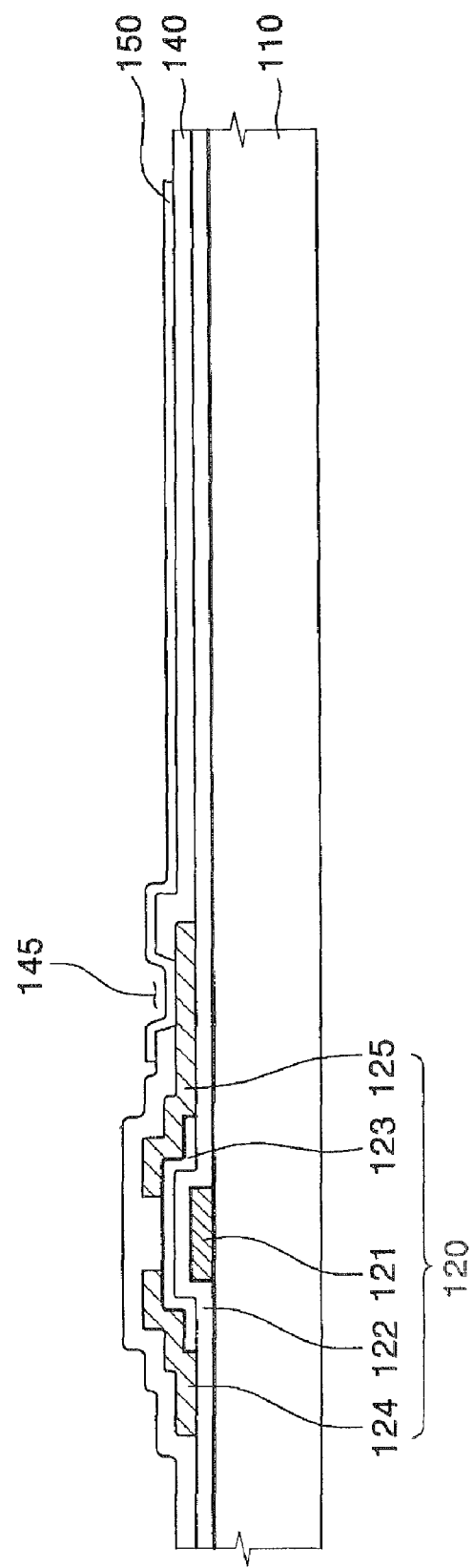

Referring to FIG. 9B, the transmission electrode 150 having a predetermined width is formed by patterning the transparent conductive layer. The transparent conductive layer includes ITO or IZO. The transmission electrode 150 is formed on the inorganic insulating layer 140, has a predetermined area and is electrically connected to the drain electrode 125 via the contact hole 145.

Figure 9C:
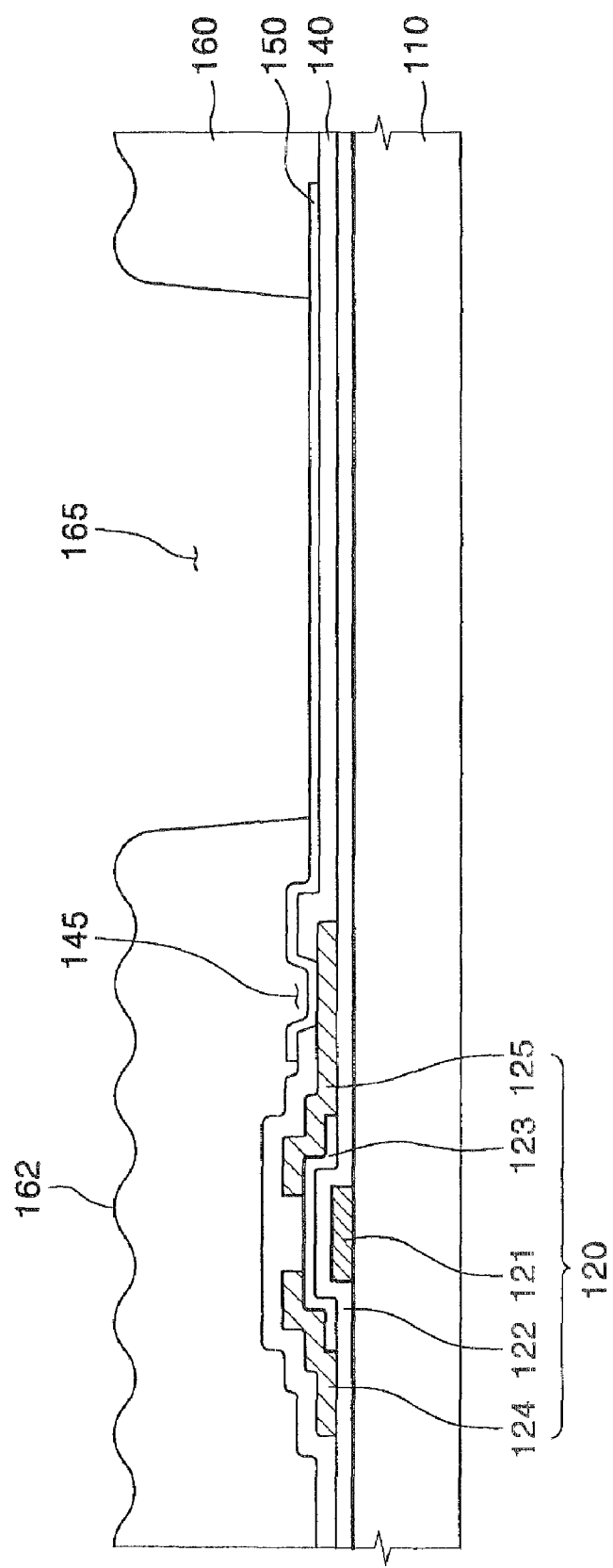

Referring to FIG. 9C, the organic insulating layer 160 is formed by a photolithography process, wherein a photosensitive photoresist having a predetermined thickness is used. The photoresist is formed on the first substrate 110 having the transmission electrode 150.

The organic insulating layer 160 includes an embossing pattern 162 formed on the upper surface thereof and a window 165 exposing a predetermined region of the transmission electrode 150. A predetermined part of the organic insulating layer 160 may be removed to form the window 165 exposing a predetermined region of the transmission electrode 150.

Figure 9D:
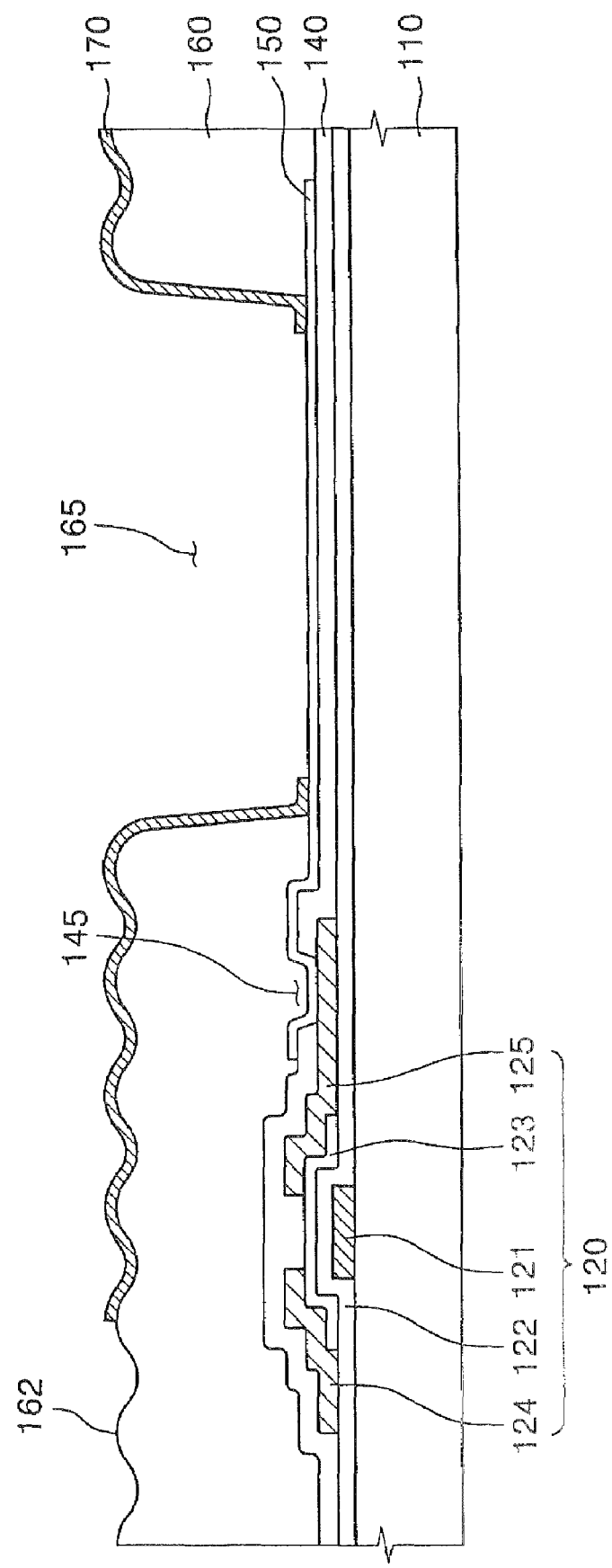

Referring to FIG. 9D, the reflection electrode 170 is formed by patterning a layer made of metal having high reflectivity, such as, for example, Al, Ag, and Cr. The metal layer is provided on the organic insulating layer 160. The reflection electrode 170 extends from an upper surface of the organic insulating layer 160 to an edge of the transmission electrode 150, which is exposed through the window 165, so as to be electrically connected to the transmission electrode 150.

Figure 10:
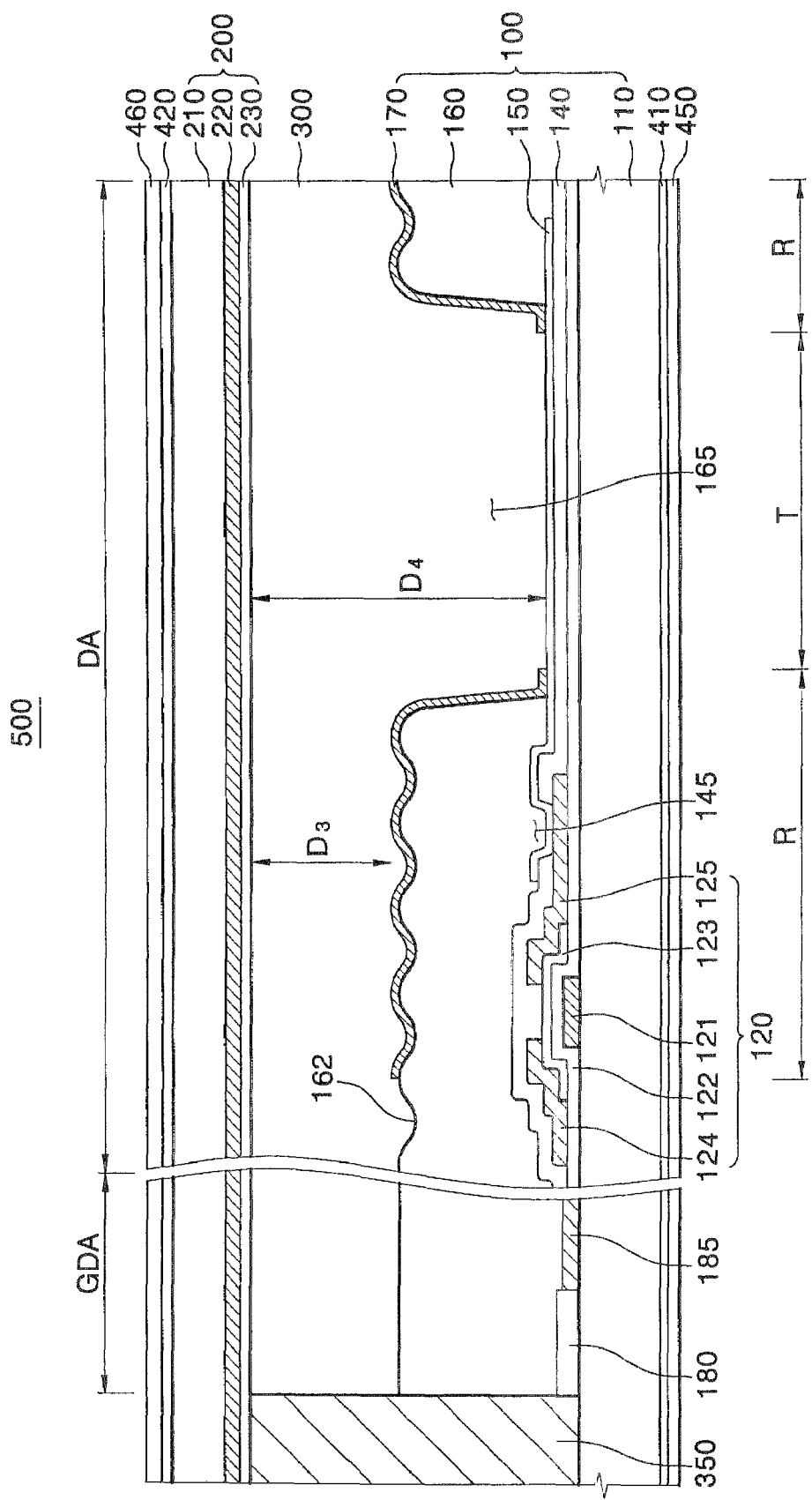
FIG. 10 is a sectional view showing a reflection-transmission type liquid crystal display device according to a fourth embodiment of the present invention.

FIG. 10 is a sectional view showing a reflection-transmission type liquid crystal display device 500 according to a fourth embodiment of the present invention. Referring to FIG. 10, a reflection-transmission type liquid crystal display device 500 according to the fourth embodiment of the present invention includes a thin film transistor substrate 100, a color filter substrate 200 oppositely coupled to the thin film transistor substrate 100, and a liquid crystal layer 300 interposed between the thin film transistor substrate 100 and the color filter substrate 200.

The reflection-transmission type liquid crystal display device 500 has a pixel region DA for displaying an image. A gate driving circuit region GDA is provided in a peripheral region adjacent to the pixel region DA. The pixel region DA and the gate driving circuit region are provided on one side of a sealant 350 for coupling the thin film transistor substrate 100 to the color filter substrate 200.

The pixel region DA of the reflection-transmission type liquid crystal display device 500 is similar to the pixel region of the reflection-transmission type liquid crystal display device 500 shown in FIG. 2, and will not be described further below.

In addition, the gate driving circuit region GDA is similar to the gate driving circuit region GDA shown in FIGS. 5, 6 and 7, except for an inorganic insulating layer 140, which extends from the pixel region DA and is provided on the second conductive pattern 184 of the stage 181 shown in FIG. 7. First and second conductive patterns 183 and 184 are electrically connected to each other by means of conductive pads CP through contact holes formed therein.

An organic insulating layer 160 formed in the pixel region DA extends to the gate driving circuit region GDA so as to cover a gate driving circuit section 180. The organic insulating layer 160 having a dielectric constant lower than a dielectric constant of the liquid crystal layer 300 may be provided between the gate driving circuit section 180 and the common electrode 230 of the color filter substrate 200. Since capacitance is generally proportional to dielectric constant, parasitic capacitance created between the gate driving circuit section 180 and the common electrode 230 can be reduced by replacing a predetermined portion of the liquid crystal layer 300 with the organic insulating layer 160 having a lower dielectric constant. Accordingly, a gate driving signal supplied to a gate line of the pixel region DA from the gate driving circuit section 180 is prevented from being distorted by parasitic capacitance.

Figure 11A:
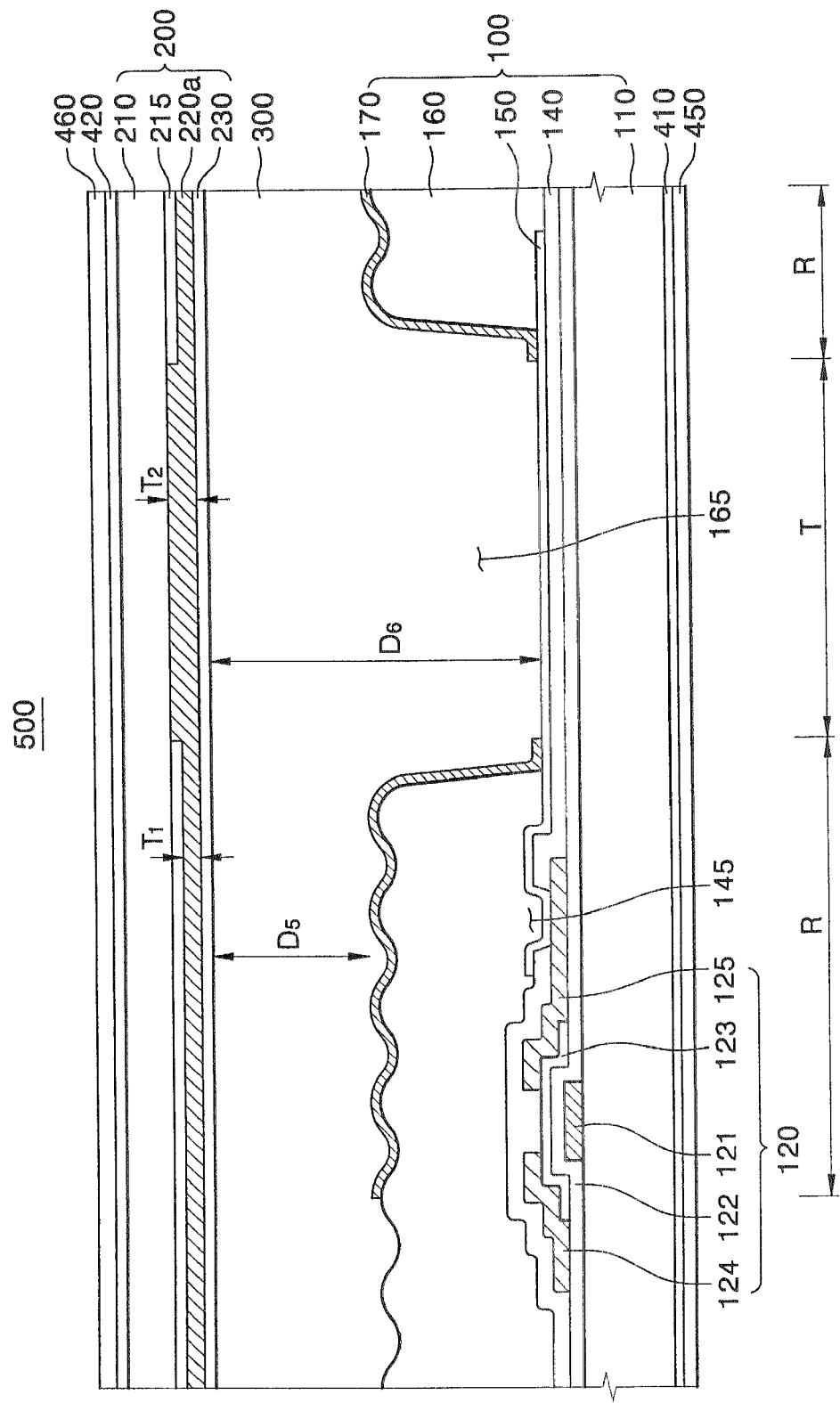
FIG. 11A is a sectional view showing a reflection-transmission type liquid crystal display device according to a fifth embodiment of the present invention.

FIG. 11A is a sectional view showing a reflection-transmission type liquid crystal display device 500 according to a fifth embodiment of the present invention. FIG. 11B is a sectional view showing a reflection-transmission type liquid crystal display device 500 according to a sixth embodiment of the present invention.

Referring to FIG. 11A, a reflection-transmission type liquid crystal display device 500 according to the fifth embodiment of the present invention includes a thin film transistor substrate 100, a color filter substrate 200 oppositely coupled to the thin film transistor substrate 100, and a liquid crystal layer 300 interposed between the thin film transistor substrate 100 and the color filter substrate 200.

The thin film transistor substrate 100 has a function and structure that are similar to those of the thin film transistor substrate 100 described with reference to FIG. 8, so the thin film transistor substrate 100 will not be described further below.

The color filter substrate 200 includes a second substrate 210, a thickness adjusting member 215, a color filter layer 220a having a first thickness T1 and a second thickness T2, and a common electrode 230.

The thickness adjusting member 215 is provided on the second substrate 210. A region of the second substrate 210 corresponding to the window 165 is exposed by removing a predetermined part of the thickness adjusting member 215. In other words, a region of the thickness adjusting member 215 across from the window 165 is removed to expose a part of the second substrate 210 formed under the thickness adjusting member 215.

The color filter layer 220a is provided on the second substrate 210 so as to cover the thickness adjusting member 215. Due to the removal of predetermined portions of the thickness adjusting member 215, the color filter layer 220a has a first thickness T1 corresponding to a reflection region and the second thickness T2 to the first thickness T1 is approximately 2:1.

Light incident into the reflection region R and reflected by the reflection electrode 170 passes through a predetermined portion of the color filter layer 220a having the first thickness T1 two times. Light transmitted through the transmission region T passes through a predetermined portion of the color filter layer 220a having the second thickness T2 one time. Therefore, both reflected light and transmitted light pass through the same total area of the color filter layer 220a, so the same color-reproducing features can be achieved with respect to the reflection region R and the transmission region T.

Referring to FIG. 11B, a reflection-transmission type liquid crystal display device 500 according to the sixth embodiment of the present invention includes a thin film transistor substrate 100, a color filter substrate 200 oppositely coupled to the thin film transistor substrate 100, and a liquid crystal layer 300 interposed between the thin film transistor substrate 100 and the color filter substrate 200.

The thin film transistor substrate 100 has a function and structure similar to those of the thin film transistor substrate 100 described with reference to FIG. 8, so the thin film transistor substrate 100 will not be described further below.

The color filter substrate 200 has a color filter layer 220b provided on the second substrate 210. The color filter layer 220b does not have a uniform thickness. The color filter layer 220b includes a predetermined portion thereof having a third thickness T3 and a predetermined portion thereof having a fourth thickness T4. The third and fourth thicknesses T3, T4 respectively correspond to a reflection region R and a transmission region T. The ratio of the fourth thickness T4 to the third thickness T3 is approximately 2:1.

Similar to the scenario described with respect to FIG. 11A, light incident into the reflection region R and reflected by the reflection electrode 170 passes through a predetermined portion of the color filter layer 220a having the third thickness T3 two times. Light transmitted through the transmission region T passes through a predetermined portion of the color filter layer 220a having the fourth thickness T4 one time. Therefore, both reflected light and transmitted light pass through the same total area of the color filter layer 220a, so the same color-reproducing features can be achieved with respect to the reflection region R and the transmission region T.

Figure 12:
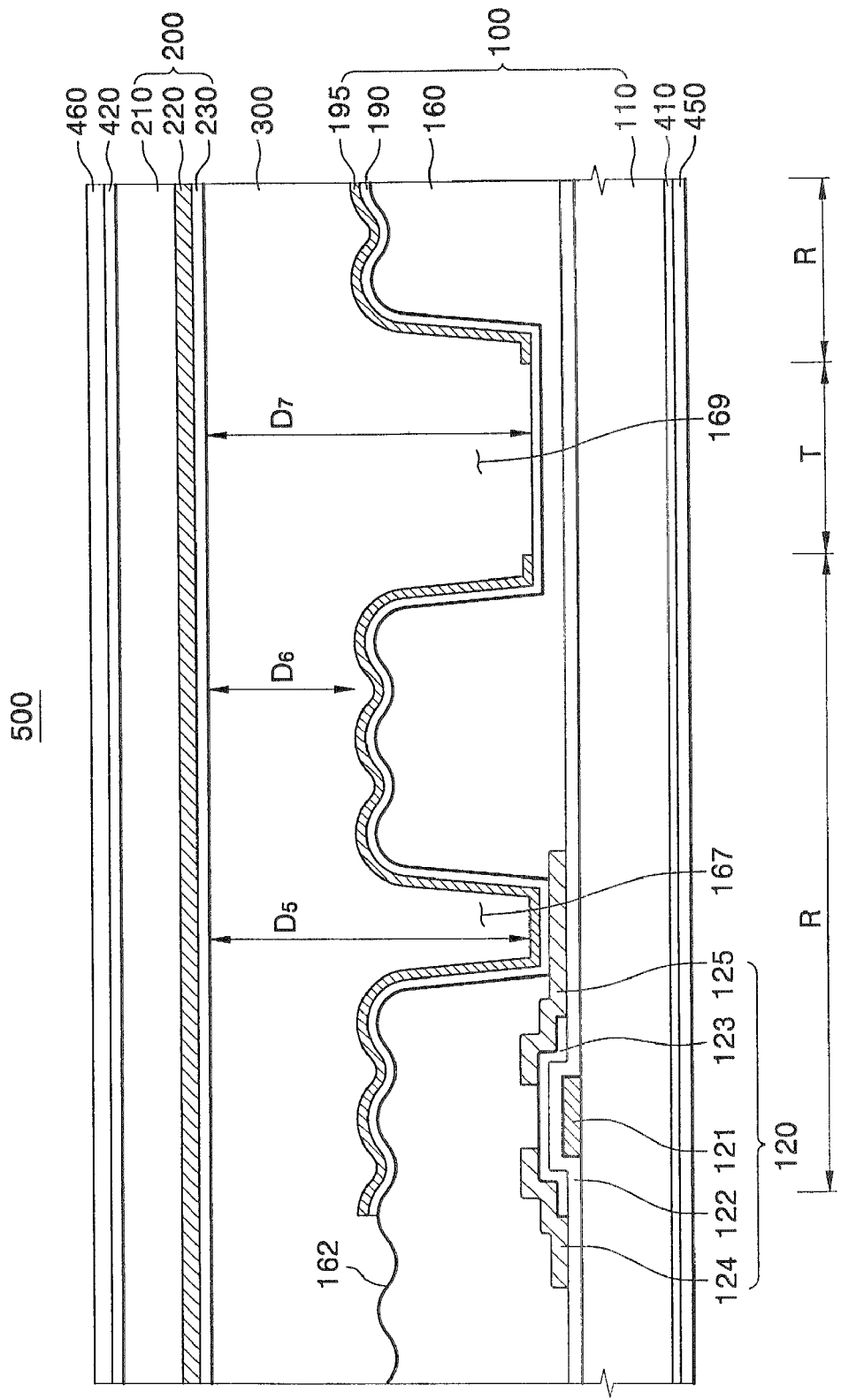
FIG. 12 is a sectional view showing a reflection-transmission type liquid crystal display device according to a seventh embodiment of the present invention.

FIG. 12 is a sectional view showing a reflection-transmission type liquid crystal display device 500 according to a seventh embodiment of the present invention.

Referring to FIG. 12, a reflection-transmission type liquid crystal display device 500 according to the seventh embodiment of the present invention includes a thin film transistor substrate 100, a color filter substrate 200 oppositely coupled to the thin film transistor substrate 100, and a liquid crystal layer 300 interposed between the thin film transistor substrate 100 and the color filter substrate 200.

The thin film transistor substrate 100 includes a first substrate 110, a thin film transistor 120, an organic insulating layer 160, a transmission electrode 190 and a reflection electrode 195.

The thin film transistor 120 has a gate electrode 121 branched from a gate line 131 (FIG. 3) extending in a first direction, and source and drain electrodes 124 and 125 branched from a data line (FIG. 3) extending in a second direction, which is perpendicular to the first direction. A gate insulating layer 122 is deposited on an entire surface of the first substrate 110 in order to protect the gate electrode 121, and a semiconductor layer 123 is formed on the gate insulating layer 122 corresponding to the gate electrode 121.

The organic insulating layer 160 includes photosensitive acryl resin and is provided on the first substrate 110, on which the thin film transistor 120 is formed. A contact hole 167 for exposing the drain electrode 125 of the thin film transistor 120 is formed in the organic insulating layer 160. An embossing pattern 162 is formed on an upper surface of the organic insulating layer 160.

The transmission electrode 190 is formed on the organic insulating layer 160 and includes ITO or IZO. The transmission electrode 190 is electrically connected to the drain electrode 125 through the contact hole 167. The reflection electrode 195 including metal having high reflectivity, such as, for example, Al, Ag, and Cr, is formed on the transmission electrode 190.

A window 169 defines a transmission region T for transmitting internal light supplied from a light generating device (not shown) provided in the reflection-transmission type liquid crystal display device 500. A predetermined region of the reflection electrode 195 provided on the transmission electrode 190 is removed so that the transmission electrode 190 corresponding to the transmission region T is exposed. The reflection electrode 195 formed on the transmission electrode 190 defines a reflection region R for reflecting external light incident from an exterior of the reflection-transmission type liquid crystal display device 500.

The color filter substrate 200 includes a second substrate 210, a color filter layer 220, and a common electrode 230. The color filter layer 220 is provided on the second substrate 210 and includes a plurality of red, green and blue (R, G and B) color pixels, which are uniformly aligned.

The common electrode 230 is provided on the color filter layer 220 and corresponds to the transmission electrode 190 and the reflection electrode 195 of the thin film transistor substrate 100. Like the transmission electrode 190, the common electrode 230 includes ITO or IZO.

The liquid crystal layer 300 is disposed between the thin film transistor substrate 100 and the color filter substrate 200. The liquid crystal layer 300 is divided into a first part corresponding to the area occupied by the contact hole 167 in the reflection region R, a second part corresponding to a non-contact hole area in the reflection region R, and a third part corresponding to the transmission region T. The first, second and third parts have thicknesses that are different from each other.

The thickness of the first part is defined as a fifth thickness D5, a thickness of the second part is defined as a sixth thickness D6, and a thickness of the third part is defined as a seventh thickness D7. The fifth, sixth and seventh thicknesses satisfy the following condition: $D6<D5 \leq D7$. Further, the ratio of the seventh thickness D7 to the sixth thickness D6 is approximately 2:1.

An optimum thickness of the liquid crystal layer 300 with respect to the reflection region R and the transmission region T varies depending on the liquid crystal molecules forming the liquid crystal layer 300 and the condition of optical films provided at upper and lower portions of the liquid crystal layer 300. Preferred thicknesses may include a sixth thickness D6 less than approximately 1.7 µm, and a seventh thickness D7 less than approximately 3.3 µm.

Since the reflection region R and the transmission region T of the reflection-transmission type liquid crystal display device 500 are operated in a multi-cell gap mode, in which a cell gap of the reflection region R is different from a cell gap of the transmission region T, light loss caused by polarization characteristics can be prevented in the transmission region T, and transmittance in the transmission region T can be improved.

Figure 13:
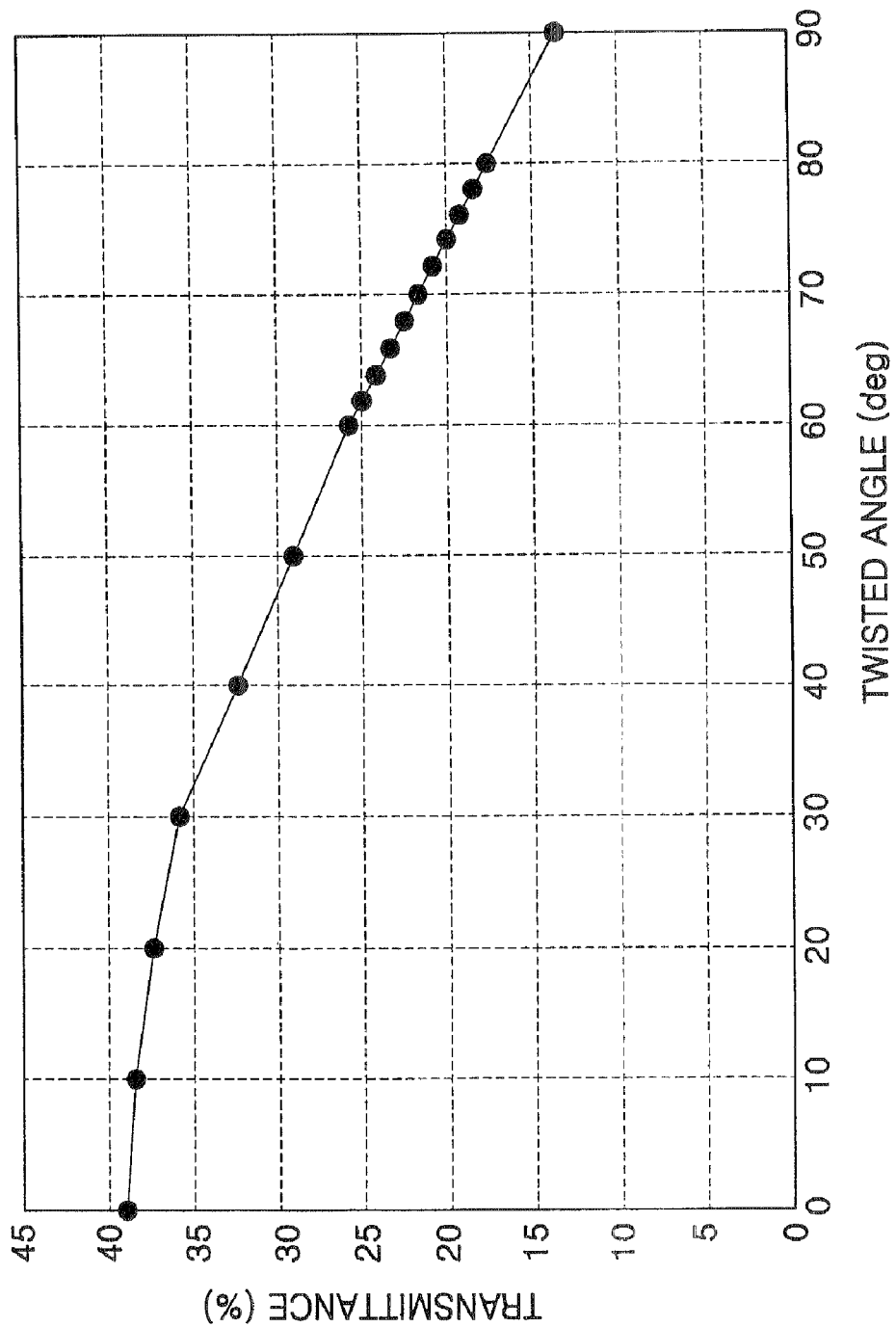
FIG. 13 is a graph showing transmittance of a reflection-transmission type liquid crystal display device according to tilting angles of liquid crystal.

FIG. 13 is a graph showing transmittance of a reflection-transmission type liquid crystal display device with respect to liquid crystal tilting angle.

The liquid crystal tilting angle is an angle defined between a first aligning direction of the liquid crystal layer adjacent to a first substrate and a second aligning direction of the liquid crystal layer adjacent to a second substrate, when the liquid crystal layer is interposed between the first and second substrates. The aligning direction represents a long-axis direction of liquid crystal molecules having a long-axis and a short-axis. Referring to FIG. 13, as the liquid crystal tilting angle is enlarged, the transmittance of the reflection-transmission type liquid crystal display device is reduced.

The reflection-transmission type liquid crystal display device, in accordance with the present invention, has a reflection region and a transmission region and is operated in a multi-cell gap mode, in which a cell gap of the reflection region R is one-half the cell gap of the transmission region T, in order to prevent light loss caused by polarization characteristics.

When the liquid crystal tilting angle is zero, which means the liquid crystal layer is homogeneously aligned, the transmittance in the transmission region is about 40%. On the contrary, if the liquid crystal tilting angle is 90°, which means the liquid crystal layer is twisted, the transmittance in the transmission region is about 151%, which is lower than the transmittance in the transmission region when the liquid crystal tilting angle is zero.

Accordingly, in order to further improve the transmittance in the transmission region of the reflection-transmission type liquid crystal display device having the multi-cell gap structure described with reference to FIGS. 2 to 12B, the liquid crystal layer may be homogeneously aligned to form a liquid crystal tilting angle that is at or near zero degrees. In alternate embodiments, the liquid crystal tilting angle also may vary between approximately 0 and 50 degrees where transmittance ranges from about 40% to 30%.

As described above, according to the present invention, a window formed by removing a predetermined portion of an organic insulating layer and a reflection electrode formed on the organic insulating layer are provided to define a transmission region and a reflection region, respectively.

A cell gap of the transmission region is different from a cell gap of the reflection region so that loss of light in the transmission region can be prevented, thereby improving the transmittance of light. In addition, transmittance is further improved by providing a liquid crystal layer that is homogeneously aligned to form a zero degree liquid crystal tilting angle.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A liquid crystal display device comprising:
    a first substrate including a thin film transistor formed thereon, the thin film transistor including a source and a drain electrode;
    a first electrode formed on the first substrate and electrically connected to the thin film transistor;
    a first insulating layer formed on the first substrate including the thin film transistor and the first electrode;
    a window formed in the first insulating layer, wherein a portion of the first insulating layer is removed in the window, the window exposing a predetermined region of the first electrode without overlapping the drain electrode;
    a second electrode provided on the first insulating layer and electrically connected to the first electrode, wherein the second electrode extends around a side of the first insulating layer to a point on the first electrode adjacent the exposed predetermined region;
    a second substrate including a third electrode formed thereon;
    a first gap between a surface of the third electrode and a surface of the predetermined region of the first electrode; and
    a second gap between the surface of the third electrode and a surface of the second electrode, wherein the first gap and the second gap include a liquid crystal layer.

2. The device as recited in claim 1, wherein the first electrode is a transmission electrode and the window defines a transmission region for transmitting light supplied from a source internal to the device.

3. The device as recited in claim 1, wherein the second electrode is a reflection electrode and an area including the reflection electrode defines a reflection region for reflecting light supplied from a source external to the device.

4. The device as recited in claim 1, wherein the first gap is about twice as long as the second gap.

5. The device as recited in claim 1, wherein a thickness of the first insulating layer ranges from about 0.5 μm to about 2.5 μm.

6. The device as recited in claim 1, further comprising a gate driving circuit region including a gate driving circuit section.

7. The device as recited in claim 6, wherein the first insulating layer extends into the gate driving circuit region over the gate driving circuit section.

8. The device as recited in claim 7, wherein the first insulating layer has a dielectric constant less than a dielectric constant of the liquid crystal layer.

9. The device as recited in claim 6, further comprising a second insulating layer formed on the first substrate and extending into the gate driving circuit region.

10. The device as recited in claim 1, further comprising a second insulating layer formed on the first substrate.

11. The device as recited in claim 10, wherein the second insulating layer includes a contact hole and the first electrode is electrically connected to the thin film transistor through the contact hole.

12. The device as recited in claim 1, further comprising a color filter layer and a thickness adjusting member formed on the second substrate, wherein the color filter layer is disposed on the thickness adjusting member.

13. The device as recited in claim 12, wherein a predetermined part of the thickness adjusting member corresponding to the window is removed, whereby a thickness of a first area of the color filter layer corresponding to the window is about twice a thickness of a second area of the color filter layer not corresponding to the window.

14. The device as recited in claim 1, further comprising a color filter layer formed on the second substrate, wherein a thickness of a first area of the color filter layer corresponding to the window is greater than a thickness of a second area of the color filter layer not corresponding to the window.

15. The device as recited in claim 1, further comprising a color filter layer formed on the second substrate, wherein a thickness of a first area of the color filter layer corresponding to the window is about twice a thickness of a second area of the color filter layer not corresponding to the window.

16. A liquid crystal display device comprising:
   a first substrate including a thin film transistor formed thereon, the thin film transistor including a source and a drain electrode;
   an insulating layer formed on the first substrate including the thin film transistor, wherein the insulating layer has a window to form a stepped portion;
   a first electrode formed on the insulating layer and electrically connected to the thin film transistor;
   a second electrode provided on the first electrode, wherein a predetermined portion of the second electrode in the window is removed for exposing a predetermined portion of the first electrode in the window, wherein the second electrode extends around the stepped portion to a point adjacent the exposed predetermined portion, and the window does not overlap the drain electrode;
   a second substrate including a third electrode formed thereon;
   a first gap between a surface of the third electrode and a surface of the predetermined portion of the first electrode; and
   a second gap between the surface of the third electrode and a surface of the second electrode, wherein the first gap and the second gap include a liquid crystal layer.

17. The device as recited in claim 16, wherein the first gap is about twice as long as the second gap.

18. The device as recited in claim 16, wherein the first gap is less than about 3.3 μm and the second gap is less than about 1.7 μm.

19. The device as recited in claim 16, further comprising a contact hole formed in the insulating layer, wherein the first electrode is electrically connected to the thin film transistor through the contact hole.

20. The device as recited in claim 19, further comprising a third gap between the surface of the third electrode and a surface of the second electrode in an area occupied by the contact hole, wherein the third gap includes the liquid crystal layer and a relationship between sizes of the first, second and third gaps is defined by the following: second gap<third gap≦first gap.

* * * * *